(12) United States Patent
Cockerill et al.

(10) Patent No.: US 12,068,704 B2
(45) Date of Patent: Aug. 20, 2024

(54) METHOD AND SYSTEM FOR CONTROLLING A FREE PISTON MOVER

(71) Applicant: LIBERTINE FPE LTD, York (GB)

(72) Inventors: Samuel Edward Cockerill, York (GB); Matthew Viele, Florissant, CO (US)

(73) Assignee: Libertine FPE Ltd, York (GB)

( * ) Notice: Subject to any disclaimer, the term of this patent is extended or adjusted under 35 U.S.C. 154(b) by 443 days.

(21) Appl. No.: 17/416,214

(22) PCT Filed: Dec. 20, 2019

(86) PCT No.: PCT/GB2019/053667
§ 371 (c)(1),
(2) Date: Jun. 18, 2021

(87) PCT Pub. No.: WO2020/128515
PCT Pub. Date: Jun. 25, 2020

(65) Prior Publication Data
US 2022/0085743 A1     Mar. 17, 2022

(30) Foreign Application Priority Data
Dec. 21, 2018   (GB) ...................... 1821016

(51) Int. Cl.
*G05B 13/04*   (2006.01)
*H02K 7/18*    (2006.01)
*H02P 25/06*   (2016.01)

(52) U.S. Cl.
CPC ............ *H02P 25/06* (2013.01); *G05B 13/042* (2013.01); *H02K 7/1884* (2013.01)

(58) Field of Classification Search
CPC ........ F02B 71/00; F02B 71/04; F02B 63/041; F02B 63/04; G05B 13/042;
(Continued)

(56) References Cited

U.S. PATENT DOCUMENTS 4,653,274 A      3/1987  David
6,151,608 A *   11/2000  Abrams ................ G06F 16/214
                                                    707/999.1
(Continued)

FOREIGN PATENT DOCUMENTS

DE   102008030633 A1    12/2009
EP      1740804 A1     1/2007
(Continued)

OTHER PUBLICATIONS

Combined Search and Examination Report for UK Patent Application No. GB1821016.1, mailed Jun. 24, 2019.
(Continued)

*Primary Examiner* — Darrin D Dunn
(74) *Attorney, Agent, or Firm* — Andrus Intellectual Property Law, LLP

(57) ABSTRACT

A method of controlling a Free Piston Mover, the method comprising the steps of: generating a Control Parameter Set for closed loop control of a Target Control Variable, this set comprising a Target Control Variable Function together with one or more of: a Stroke Threshold Function; a Feed Forward Current Function; a Feedback Terms Function; Control Parameter Set Transition Conditions; transmitting the Control Parameter Set to an In-Stroke Controller in advance of the start of a Stroke to be controlled; modifying one or more of the constituents of the Control Parameter Set for any Future Stroke of the Free Piston Mover using a Future-Stroke Controller; and transmitting the modified Control Parameter Set to the In-Stroke Controller for the control of any Future Stroke.

13 Claims, 16 Drawing Sheets

(58) Field of Classification Search
CPC ........... G05B 2219/42195; G05B 2219/34013; G05B 2219/43171; H02K 7/1884; H02K 7/1869

See application file for complete search history.

(56) References Cited

U.S. PATENT DOCUMENTS

| | | | | |
|---|---|---|---|---|
| 6,167,405 | A * | 12/2000 | Rosensteel, Jr. | G06F 16/283 707/999.102 |
| 11,739,705 | B2 * | 8/2023 | Roelle | F02D 35/024 701/102 |
| 2002/0107585 | A1 * | 8/2002 | Lu | G05B 13/048 700/42 |
| 2007/0061786 | A1 * | 3/2007 | Zhou | G06F 9/451 717/136 |
| 2008/0122408 | A1 | 5/2008 | Keiter et al. | |
| 2011/0168011 | A1 * | 7/2011 | Takei | F16K 31/0613 91/277 |
| 2012/0125401 | A1 * | 5/2012 | DeVillier | H02S 20/10 136/246 |
| 2017/0350339 | A1 | 12/2017 | Roelle et al. | |
| 2018/0051690 | A1 | 2/2018 | Stair et al. | |
| 2018/0260053 | A1 * | 9/2018 | Hong | G06F 3/0446 |

FOREIGN PATENT DOCUMENTS

| | | |
|---|---|---|
| GB | 2454297 A | 5/2009 |
| JP | 2016109123 A | 6/2016 |
| WO | 2011068258 A1 | 6/2011 |

OTHER PUBLICATIONS

International Search Report and Written Opinion for PCT Patent Application No. PCT/GB2019/053667, mailed Aug. 17, 2020.

* cited by examiner

Section A – A

Figure 11

| Base Variable BV (Position, mm) | Control Variable CV (Velocity, m/s) |
|---|---|
| 0.00 | 0.00 |
| 1.00 | 0.17 |
| 2.00 | 0.34 |
| 3.00 | 0.50 |
| 4.00 | 0.64 |
| 5.00 | 0.77 |
| 6.00 | 0.87 |
| 7.00 | 0.94 |
| 8.00 | 0.98 |
| 9.00 | 1.00 |
| 10.00 | 0.98 |
| 11.00 | 0.94 |
| 12.00 | 0.87 |
| 13.00 | 0.77 |
| 14.00 | 0.64 |
| 15.00 | 0.50 |
| 16.00 | 0.34 |
| 17.00 | 0.17 |
| 18.00 | 0.00 |

Figure 12

| Base Variable BV (Position, mm) | Stroke Transition Theshold ST (Velocity, m/s) |
|---|---|
| 0.00 | -1.00 |
| 1.00 | -1.00 |
| 2.00 | -1.00 |
| 3.00 | -1.00 |
| 4.00 | -1.00 |
| 5.00 | -1.00 |
| 6.00 | -1.00 |
| 7.00 | -1.00 |
| 8.00 | -1.00 |
| 9.00 | -1.00 |
| 10.00 | -1.00 |
| 11.00 | -1.00 |
| 12.00 | -1.00 |
| 13.00 | -1.00 |
| 14.00 | -1.00 |
| 15.00 | 0.10 |
| 16.00 | 0.10 |
| 17.00 | 0.10 |
| 18.00 | 0.10 |

Figure 13

| Base Variable BV (Position, mm) | Feed Forward Current QFF (Amps) |
|---|---|
| 0.00 | 40.00 |
| 1.00 | 39.39 |
| 2.00 | 37.59 |
| 3.00 | 34.64 |
| 4.00 | 30.64 |
| 5.00 | 25.71 |
| 6.00 | 20.00 |
| 7.00 | 13.68 |
| 8.00 | 6.95 |
| 9.00 | 0.00 |
| 10.00 | -6.95 |
| 11.00 | -13.68 |
| 12.00 | -20.00 |
| 13.00 | -25.71 |
| 14.00 | -30.64 |
| 15.00 | -34.64 |
| 16.00 | -37.59 |
| 17.00 | -39.39 |
| 18.00 | -40.00 |

Figure 14

| Base Variable BV (Position, mm) | Control Variable CV (Velocity, m/s) | Stroke Transition Theshold ST (Velocity, m/s) | Feed Forward Current QFF (Amps) |
|---|---|---|---|
| 0.00 | 0.00 | -1.00 | 40.00 |
| 1.00 | 0.17 | -1.00 | 39.39 |
| 2.00 | 0.34 | -1.00 | 37.59 |
| 3.00 | 0.50 | -1.00 | 34.64 |
| 4.00 | 0.64 | -1.00 | 30.64 |
| 5.00 | 0.77 | -1.00 | 25.71 |
| 6.00 | 0.87 | -1.00 | 20.00 |
| 7.00 | 0.94 | -1.00 | 13.68 |
| 8.00 | 0.98 | -1.00 | 6.95 |
| 9.00 | 1.00 | -1.00 | 0.00 |
| 10.00 | 0.98 | -1.00 | -6.95 |
| 11.00 | 0.94 | -1.00 | -13.68 |
| 12.00 | 0.87 | -1.00 | -20.00 |
| 13.00 | 0.77 | -1.00 | -25.71 |
| 14.00 | 0.64 | -1.00 | -30.64 |
| 15.00 | 0.50 | 0.10 | -34.64 |
| 16.00 | 0.34 | 0.10 | -37.59 |
| 17.00 | 0.17 | 0.10 | -39.39 |
| 18.00 | 0.00 | 0.10 | -40.00 |

METHOD AND SYSTEM FOR CONTROLLING A FREE PISTON MOVER

CROSS-REFERENCE TO RELATED APPLICATIONS

This application is the U.S. national stage application of International Application PCT/GB2019/053667, filed Dec. 20, 2019, which international application was published on Jun. 25, 2020, as International Publication WO 2020/128515 in the English language. The international application is incorporated herein by reference, in entirety. The international application claims priority to GB Patent Application No. 1821016.1, filed Dec. 21, 2018, which is incorporated herein by reference, in entirety.

This invention relates to a control method and control system for a Free Piston Mover (FPM) whether incorporated within a Free Piston Linear Generator (FPLG), a Linear Motor Reciprocating Compressor (LMRC), a Free Piston Gas Expander (FPGE), a Linear Motor Reciprocating Pump (LMRP) or a Linear Motor Reciprocating Actuator (LMRA) or other type of Linear Power System product.

These various types of Linear Power System (LPS) product, each incorporating one or more FPMs, are well known in themselves. In each case there is a Linear Electro-Mechanical System and a Linear Thermo-Fluidic System which are coupled through the linear motion of the Free Piston Mover.

Optimal system performance for such products typically requires some combination of efficiency, repeatability, precision, reliability and (in the case of Linear Power System products incorporating more than one FPM) synchronisation. Optimal system performance often depends on the precise control of FPM movement.

The total addressable market for products incorporating FPMs is in excess of $100 bn p.a. and 200 m units p.a. The largest application within this total addressable market is for FPLG products which have the potential to displace conventional internal combustion engines from automotive and distributed power generation applications.

To date, commercial exploitation of products incorporating FPMs remained limited due to the inadequacy of existing control methods and control systems governing piston motion to achieve optimal system performance. Piston motion control within products incorporating FPMs is cited by experts in the field of the present invention as the most significant unresolved challenge to widespread use of products incorporating FPMs.

For the purpose of describing the field of the invention and the background to the invention, the following terminology definitions are used:

Linear Electrical Machine (Abbreviated "LEM"): An electrical machine capable of acting as a motor or generator and which, in use, produces a linear electromagnetic force acting on a moving part or assembly within the LEM. This force may be varied by modulation of an electrical current flowing in one or more conducting coils arranged within the LEM. When acting as a motor or generator there is also relative motion between a static part or assembly within the LEM and the moving part or assembly within the LEM.

Stator: The part or assembly within a LEM which is typically static relative to the system within which the LEM operates.

Translator: The part or assembly within a LEM which typically moves relative to the Stator.

Linear Electro-Mechanical System (Abbreviated "LEMS"): A physical system comprising a LEM together with other mechanical elements that may include linear bearings and seals in which forces acting on the Translator include the linear electromagnetic force applied by the LEM together with friction forces associated with the other mechanical elements, and other forces mechanically coupled from external systems.

Linear Thermo-Fluidic System (Abbreviated "LTFS"): A physical system comprising a working chamber and a moveable piston in which the volume of the working chamber is altered by the linear movement of the piston. The working chamber contains a working fluid which, through the linear movement of the piston, may be either expanded or compressed within the working chamber, or admitted into the working chamber, or displaced from the working chamber. The LTFS may also include valves for the admission and discharge of working fluid from the working chamber. The pressure of working fluid within the working chamber produces a force acting upon the piston, and this force depends on multiple factors including for example: (i) the compressibility of the working fluid, (ii) the motion of the piston, (iii) the addition or reduction of moles of fluid within the working chamber via valves within the LTFS or as a result of chemical reactions (for example combustion) or by fluid injection (for example by means of a water or fuel injector), (iv) the addition or removal of heat to/from the working chamber as a result of heat transfer to/from the working chamber walls and/or as a result of chemical reactions within the working chamber (for example, combustion between a fuel and an oxidizer) and (v) a phase change within the working fluid.

Piston: The moving component or feature within a LTFS causing a change in the volume of the working chamber volume within the LTFS Linear Power System (Abbreviated "LPS"): A product or system comprising at least one LEMS and one LTFS in which the Translator of the LEM within the LEMS incorporates or is mechanically coupled via a fixed linkage or component to the Piston of the LTFS. In such a system the performance of the LPS is determined by the performance of the LEMS and LTFS sub-systems, and may be characterised in terms of the efficiency, repeatability, precision, reliability and durability of these sub-systems. Where the LTFS working chamber is a combustion chamber converting fuel energy into mechanical work acting upon the piston, the performance of the LPS also depends on the timing, speed and completeness of the combustion reaction and the resulting emissions formed in the working chamber gases following this reaction. The system performance of the LPS according to these characteristics depends critically on the motion of the Translator within the LEMS and the Piston within the LFTS, which are coupled together and move with a common profile of linear motion varying with time.

Free Piston Mover (Abbreviated "FPM"): The common moving part or assembly within a LPS acting as the Translator within the LEMS and acting as the Piston within the LTFS.

Free Piston Linear Generator (Abbreviated "FPLG"): An internal combustion engine-generator system incorporating a LPS in which the working chamber of the LTFS is a combustion chamber, and in which the output of the LEMS is electrical power. A FPLG typically may also include auxiliary systems necessary for an internal combustion engine generator including fuelling, ignition, charge air compression, cooling, engine management systems, exhaust after-treatment systems and mechanical mounting and enclosure elements. This type of system is also sometimes referred to as a Free Piston Engine (Abbreviated "FPE")

Linear Motor Reciprocating Compressor (Abbreviated "LMRC"): A system incorporating a LPS in which the working chamber of the LTFS is a gas compressor working chamber, the LTFS admitting a gaseous phase working fluid at an inlet pressure and discharging the gaseous working fluid at a higher pressure through an arrangement of valves designed and configured for this purpose. In such a system the LEMS within the LPS acts as a linear motor, using electrical power to apply mechanical work in order to compress the gaseous phase working fluid.

Free Piston Gas Expander (Abbreviated "FPGE"): A system incorporating a LPS in which the working chamber of the LTFS is a gas expander working chamber, for example within an Organic Rankine Cycle power generator. In such a system the LTFS typically admits a gaseous phase working fluid at an inlet pressure and discharges the gaseous working fluid at a lower pressure through an arrangement of valves designed and configured for this purpose. The working fluid may be admitted or discharged in liquid phase or as a two phase mixture (for example, a mixture of liquid & gas phases) however a gas phase expansion process will typically occur during the expansion of the working chamber volume. In such a system the LEMS within the LPS acts as a linear generator, producing electrical power as a result of mechanical work applied on the Piston during the expansion of the working fluid.

Linear Motor Reciprocating Pump (Abbreviated "LMRP"): A system incorporating a LPS in which the working chamber of the LTFS is a reciprocating pump working chamber, the LTFS admitting a liquid phase working fluid at an inlet pressure and discharging this liquid at a higher pressure through an arrangement of valves designed and configured for this purpose. In such a system the LEMS within the LPS acts as a linear motor, using electrical power to apply mechanical work in order to increase the pressure of the liquid phase working fluid and overcome pumping flow and friction losses.

Linear Motor Reciprocating Actuator (Abbreviated "LMRA"): A system incorporating a LPS in which the working chamber of the LTFS is bounce or preload chamber applying a force on the FPM. In such a system the LEMS within the LPS acts as a linear motor, using electrical power to produce a desired force or mechanical motion acting on an external system by means of a mechanical linkage or coupling between the FPM and the external system.

Stroke: The period or span of operation of a FPM measured in terms of a Base Variable (for example, time or position) between a Start of Stroke event and an End of Stroke event, according to the definitions of these events provided in this specification. An LPS incorporating a FPM typically performs a function through multiple consecutive Strokes, and the system performance of the LPS is a result of the aggregate system performance over multiple consecutive Strokes.

In one example in which the present invention is applicable, where the FPM forms part of a FPLG operating a "two-stroke" combustion cycle, consecutive strokes could correspond to the power/exhaust stroke and the induction/compression stroke of the combustion cycle. In this example, two consecutive Strokes form a complete cycle, and the performance of the FPLG results from the aggregate performance of multiple consecutive cycles.

Present Stroke: The Stroke presently taking place and during which period the FPM motion is acted upon by the operation of an In-Stroke Controller.

Next Stroke: The Stroke immediately following the Present Stroke.

Future Stroke: Any subsequent stroke following the Present Stroke including the Next Stroke.

Current: For clarity the word current is exclusively used to refer to electrical current flow and is not used to describe temporal significance. The word present is used to indicate the relative time of an event, action, status of an aspect of the invention or description of the environment (for example a present stroke or the present values of variables) in relation to a corresponding future or past event, action, status or description.

BACKGROUND

A Free Piston Mover (FPM) is a reciprocating moving element acting both as a Piston within a Linear Thermo-Fluidic System (LTFS) and as a Translator within a Linear Electro-Mechanical System (LEMS), these systems together forming one of a number of types of Linear Power system (LPS), for example;
  a Free Piston Linear Generator (FPLG)
  a Linear Motor Reciprocating Compressor (LMRC)
  a Free Piston Gas Expander (FPGE)
  a Linear Motor Reciprocating Pump (LMRP)
  a Linear Motor Reciprocating Actuator (LMRA).

An important feature of an LPS is that it may be considered a multi-stroke device where each stroke is typically described by the motion of the piston from a first point to a second point. For example, in a single piston FPLG containing a single working chamber a stroke might typically be described between two points at which the velocity of the FPM is close to zero, corresponding to the minimum and maximum working chamber volumes (Commonly referred to as "Top Dead Centre" and "Bottom Dead Centre" respectively). In one such embodiment of the present invention where the FPM forms part of a FPLG operating a "two-stroke" combustion cycle, consecutive strokes could correspond to the power/exhaust stroke and the induction/compression stroke of the combustion cycle. In this example, two consecutive strokes form a complete combustion cycle, and the performance of the FPLG results from the aggregate performance of multiple consecutive combustion cycles.

Several benefits of a FPM forming part of a LPS are based on the enhanced performance of the Linear Thermo-Fluidic System (LTFS) within the LPS, made possible as a result of the enhanced motion control that may be applied by the Linear Electro-Mechanical System within the LPS. For example, in the case of the Free Piston Linear Generator (FPLG), these benefits include:
  High efficiency, low emissions combustion. A class of advanced combustion methods well known to skilled combustion developers is known as Low Temperature Combustion (LTC), examples of which are Homogeneous Charge Compression Ignition (HCCI) and Spark Assisted Compression Ignition (SACI). This class of combustion methods offers the potential for efficient, low emissions combustion due to the speed of combustion, high compression ratio and low peak temperatures. In each case, the combustion process is achieved substantially or entirely through the detonation of a lean mixture compressed to a high compression ratio within a combustion chamber.
  The compression ratio must be sufficient to achieve detonation but not excessive, otherwise elevated peak chamber temperatures due to the gas compression would result in the formation of additional harmful exhaust gas emissions due to the undesirable reaction of nitrogen and oxygen in the charge air at elevated temperatures and pressures. The compression ratio necessary to successfully achieve detonation depends on the precise conditions within the combustion chamber including wall temperatures, charge air temperature, in-cylinder charge motion, fuel/air equivalence ratio, fuel/air mixing and the proportion of burned and unburned residual exhaust gas present in the chamber from previous cycles. These conditions vary from cycle to cycle. The outcome of each combustion event, as measured for example by the timing and magnitude of pressure build-up within the combustion chamber and by the conditions in the exhaust, provides an indication of whether the compression ratio, and more broadly the piston motion profile during the compression and expansion strokes of that combustion cycle, was optimal.

Therefore the piston motion profile for efficient, low emissions LTC should preferably adapt on a stroke-by-stroke basis in response to the measured or analytically inferred outcome of corresponding combustion events immediately prior to the present cycle.

In a FPLG the motion of the FPM may be controlled on a stroke-by-stroke basis, offering potential for real-time control and adjustment of compression ratio and of compression and expansion profiles. In this way, a FPLG offers a means to achieve LTC by adapting FPM motion in each cycle in response to the combustion outcomes of corresponding combustion strokes within previous cycles. FPM motion control also permits adaptations the compression ratio and compression and expansion profiles to compensate for variations impacting performance over several seconds, minutes, hours or longer periods. These may result from transient processes and phenomena such as warm up, wear over time and fuel quality variation.

Fuel Flexibility. In addition to conventional diesel and petrol fuels, a wide range of alternative internal combustion engine fuels are increasingly prevalent due to their environmental or economic benefits. These include Compressed Natural Gas (CNG), Liquid Natural Gas (LNG), Liquid Petroleum Gas (LPG), raw well-head gas (RWG), bioethanol, biodiesel, methanol, biogas, syngas and hydrogen. This diversity of new fuels presents a challenge for engine developers since each fuel may require a different compression ratio for optimal combustion. In addition, certain of these fuels are variable in nature due to the method of their production (e.g. biogas, syngas, RWG) or due to mixing that occurs in the fuel tank supplying the internal combustion engine when different fuel blends are combined (e.g. bioethanol).

In a FPLG the potential for real-time control and adjustment of compression ratio and of compression and expansion profiles permits the FPLG to achieve the compression ratio for optimal combustion, compensating for fuel composition variations. In addition, the initial or default calibration compression ratio target for a FPLG may be configured through control software. This software configurability offers significant economies of scale benefits to FPLG producers since a common FPLG design may be configured for a diversity of fuel types with minimal physical changes.

Low vibration. In an opposed piston FPLG, the elimination of torsional vibration excitations generated by cyclic combustion loads can result in very low vibration excitation loads transmitted through the FPLG mounts and intro the surrounding structure or environment.

Fast demand response. Electrical power can be generated from a FPLG within the first two or three strokes of operation without the need to 'crank' the engine for multiple cycles using a starter motor. The cooling effect on combustion chamber gas due to low wall temperatures during these initial strokes can result in misfire or incomplete combustion within a conventional internal combustion engine but may be compensated for in a FPLG by using higher compression ratio for the first few cycles or strokes.

Similar benefits may be achieved in other types of LPS based on the enhanced performance of the Linear Thermo-Fluidic System (LTFS) within the LPS, made possible as a result of the enhanced motion control that may be applied by the Linear Electro-Mechanical System within the LPS. For example, in the case of the Linear Motor Reciprocating Compressor (LMRC), the overall efficiency of the gas compressor depends on the FPM motion due to the impact of gas flow rate on flow losses at the inlet and discharge ports. Precise control of the FPM is desirable to minimise these flow losses, and adaptation of this control is preferable to reduce or limit the potential for thermal transients and other operating and environmental variables to alter the ideal FPM motion profile.

These benefits are not fully realised by the known methods of control, mainly due to the complex sequence of steps that are typically required for the precise and real-time control of the FPM motion profile within each stroke. These 'in-stroke' control steps typically include;
1. Measure of dynamic variables indicative of actual FPM motion
2. Convert of measured variables to digital values
3. Transmit digital values to dynamic controller
4. Calculate Target Control Variable(s) based on measured FPM position or time
5. Calculate an error term for the Target Control Variable
6. Calculate a target response (e.g. a target electromagnetic force applied by the LEMS on the FPM)
7. Calculate target current per coil within the LEMS to achieve the target electromagnetic force applied by the LEMS on the FPM
8. Measure actual current per coil within the LEMS
9. Calculate a current error term per coil within the LEMS
10. Calculate a switching response to be executed at each coil gate driver
11. Execute the switching response at each coil gate driver, whilst observing the current limits of the LEMS and power electronics.

These steps may typically be repeated sequentially or independently multiple times during the course of each stroke in order to reduce the error term for a Target Control Variable sufficiently for the optimal operation of the LTFS and/or complete LPS.

Many prior art systems and methods exist for the execution of in-stroke control of a FPM. For example, EP 1740804 discloses control method for in-stroke control of a FPM comprising the following steps:
1) predicting forces acting on a FPM during the stroke.
2) estimating an electromagnetic force necessary for the FPM to reach a desired state at a certain position along the stroke.

Such prior art systems have two deficiencies.

Firstly they do not adequately adjust the control of future strokes in order to maintain a Current Demand Control Margin necessary for effective control, taking account of past system performance including Current Demand Control Margin. As a result, such control systems have a tendency to become saturated—that is to say the demanded current exceeds the capacity of the LEMS and/or power electronics circuits and devices to supply current—and as a result any further changes in current demand generated by an in-stroke controller do not produce a corresponding change in current flowing in coils within the LEMS.

Secondly, they do not adequately anticipate and compensate for system changes and trends over multiple successive strokes and therefore fail to achieve or maintain optimum system performance over multiple strokes.

Much of the prior art, like EP 1740804, discloses control systems focused on in-stroke control of a FPM, by carrying out measurements or obtaining data relating to the performance of the FPM during a given stroke, and adjusting the operation of the FPM within the same stroke in which the measurements are carried out. Methods such as that disclosed in EP1740804 therefore do not operate as a Future-Stroke Controller i.e. one concerned with the system operation and performance optimisation after the present stroke, but rather seek to apply an electromagnetic force whose effect is limited changing the trajectory of the moving mass of a FPM in order to reach a desired reference condition or state at a certain position along the present stroke.

Thus, it is desirable to have an improved method that overcomes the two deficiencies identified, maintaining a Current Demand Control Margin and compensating for system changes over time, by determining an appropriate set of control parameters for future strokes of a Free Piston Mover.

For the purpose of the description of the invention, the following additional terminology definitions are used:

Free Piston Mover Control System: A control system for a LPS incorporating one or more a Free Piston Movers. A Free Piston Mover control system includes one or more Future-Stroke Controllers and one or more In-Stroke Controllers, and may also incorporate:

a Synchronisation Controller a Logging, Analytics and Diagnostic Controller and, for each FPM, a Current Controller Future-Stroke Controller: A controller whose objective is to satisfy an external Demand Input (for example a demand for electrical power output generated by another automated controller such as a hybrid vehicle powertrain control unit, or by a user of the LPS) and contribute to the optimal system performance of a LPS by generating a Next Control Parameter Set (COPS') and issuing this to the In-Stroke Controller. In the case of a LPS incorporating more than one FPM, optimal system performance may require minimisation of the Synchronisation Error. Optimal system performance may also require maintenance of system status in readiness for anticipated future Demand Inputs (for example the temperature of surfaces and materials within the LEMS and/or LTFS, and the pressures of gas reservoirs used in the operation of fuelling, charge air and bearing sub-systems).

The Future-Stroke Controller includes a Control Target Function generator which may take input from one or more of a Demand Input, a Synchronisation Controller and a Logging, Analytics and Diagnostic controller in order to generate one or more of a Next Control Variable Target Function CVt(BV)', a Next Stroke Threshold Function ST(BV, CV)', and a set of Transition Conditions (CTC)' determining the period of use of the Next Control Parameter Set by the In-Stroke Controller. The Control Target Function Generator may also generate a 'baseline' Next Feed Forward Current Function (Abbreviated "QFF0(BV,CV)'") corresponding to the expected current values that will be required to achieve the dynamic motion profile described by the Next Control Variable Target Function CVt(BV)', before adaptations are applied by the Feed Forward Current Function Generator.

The Future-Stroke Controller may also include a Feed Forward Current Function Generator, which may take input from the CV feedback controller within the In-Stroke Controller to generate an adapted Next Feed Forward Current Function QFF(BV,CV)', modified in response to the operation of the In-Stroke Controller over the course of multiple strokes.

The Future-Stroke Controller may also include a Feedback Terms Function Generator, which may take input from the Feed Forward Current Function Generator within the Future-Stroke Controller to generate an adapted Next Feedback Terms Function FBT(BV,CV)', thereby modified to take account of changes in the Next Feed Forward Current Function QFF(BV,CV)' over the course of multiple strokes.

The Future-Stroke Controller may generate one or more constituents of the Control Parameter Set by means of a Mean Value Model (MVM) based approach. A MVM based approach typically neglects variations within each discrete stroke and treats all processes and effects based on average values across one or more strokes.

The Future-Stroke Controller may generate one of more constituents of the Next Control Parameter Set with reference to multi-stroke historic and trend analysis data provided by a Logging, Analytics and Diagnostics controller.

An important difference between the Future-Stroke Controller and the In-Stroke Controller is that the Next Control Parameter Set (COPS') output of the Future Stroke controller is not required to be generated and transmitted to the In-Stroke Controller any more than once per Stroke, whereas the Current Demand output of the In-Stroke Controller is typically updated several times per stroke. The Future Stroke Controller may therefore function as a Multi-Rate Controller running at a lower computational loop rate compared to the In-Stroke Controller. The division of the functions of the In-Stroke Controller and the Future-Stroke Controller therefore enables separate, differentiated and specialist methods and processor architectures to be applied within each of these Controllers, permitting a greater degree of optimisation of the Next Control Parameter Set than would be possible if the functions of the Future-Stroke Controller were also performed by a processor architecture designed to carry out In-Stroke Controller functions. For example, the complexity of a Mean Value Model based approach to Next Control Parameter Set generation and adjustment makes this unsuitable for an In-Stroke Controller, and more appropriate for a higher level control and supervisory system such as a Future-Stroke Controller.

This functional segregation also enables enhanced performance of the In-Stroke Controller, whose functions may be limited to the rapid repetition of one or more simple calculation steps and feedback control loops, and whose operation is typically interrupted by the Future Stroke Controller no more than once per stroke.

Demand Input: A high level or supervisory input to the FPM controller specifying a required output from the LPS, for example an electrical power output, operating frequency, operating stroke length, compression ratio, compression rate, working fluid flow rate or combination thereof to be achieve via control of the movement of one or more FPMs.

The Demand Input could be generated by an end user of the LPS, or for example by another automated controller such as an Engine Control Unit (ECU) or hybrid vehicle Powertrain Control Unit (PCU).

The Demand Input could include one or more signals indicating a requirement for the Future Stroke Controller to produce an output corresponding to one or more predetermined operating points of the LPS. In addition, the Demand Input could include one or more signals permitting the Future Stroke Controller to operate the LEMS in order to maintain system status in readiness for anticipated future demand inputs.

A common Demand Input signal could be provided to multiple Future-Stroke Controllers, each controlling a Free Piston Mover within a common Linear Power System, so that together these Future-Stroke Controllers act as a 'Distributed Control Unit' for a Linear Power System.

In-Stroke Controller (also referred to as Present-Stroke Controller): A controller whose objective is to minimise one or more Control Variable Errors during the Present Stroke by generating a Current Demand output which is input to a Current Controller which in turn modulates current flowing in coils within a LPS and thereby varies an electromagnetic force acting on a FPM within the LPS. By the Current Demand output, we mean any signal that could be used to modulate the current in the coils, i.e. a voltage signal, a current signal, or any other appropriate electrical signal known to the skilled person.

Following an End of Stroke event the In-Stroke Controller may replace the constituents of the Control Parameter Set presently in use with the corresponding constituents of the Next Control Parameter Set. This replacement may occur during the stroke following each End of Stroke event. Alternatively, this replacement may be executed after two or more strokes, following satisfaction of criteria specified in a set of Control Parameter Transition Conditions.

The In-Stroke Controller may operate as a Reduced Authority Controller or Low Authority Controller (LAC).

CV Feedback Controller: A closed loop feedback controller within the In-Stroke Controller that calculates a component of Current Demand Qt based on a Control Variable Error. The feedback controller may be a 'Proportional-Integral-Derivative' (often referred to as a 'PID' controller) or one of several types of multiple-input multiple-output (MIMO) controller such as a state-space model based controller.

Current Controller: A controller whose objective is to minimise the difference between a Measured Current value (Abbreviated "Qm") flowing in one or more electrical coils of a LEM within a LPS, and the Current Demand Qt input from an In-Stroke Controller, by means of a Current Feedback Controller within the Current Controller.

The Current Feedback Controller sends a gate switching command signal to a Gate Controller which in turn applies a voltage to a Current Switching Device containing at least one circuit switching element such as an Insulated Gate Bipolar Transistor (IGBT), a Field Effect Transistor (FET), a Triode for Alternating Current (TRIAC), a Solid State Relay (SSR) or other type of electrical power relay. The operation of the Current Switching Device causes current to flow or change within at least one electrical coil of a LEM within a LPS.

The Current Controller may control current flowing within individual coils such that the current flowing in each individual coil is independent of the others. In this case the Current Demand Qt input (i.e. the output from an In-Stroke Controller) corresponds to a set of independent Current Demand values, i.e. a set of current values, a set of voltage values or any other appropriate set of values, each corresponding to the required current in each individual coil.

The Current Controller may control current flowing within groups of coils such that the current in each group of serially connected coils (each group a "phase") is independent of the others and the LEM operate as an 'N-phase' machine, where N is an integer. N phase machines in which N is 1, 2, 3 and 6 are well understood by experts familiar with this field. In this case the Current Demand Qt input (i.e. the output from an In-Stroke Controller) may correspond to a set of independent Current Demand values, i.e. a value or a set of values from which a target current can be computed, corresponding to the required current in each group of serially connected coils.

Alternatively Current Demand per phase may be determined from an aggregate demand current Qt or "Q-current demand" by reference to the measured position of the Translator within the Stator. The mapping of "Q-current demand" to phase current demand in a multi-phase electrical machine in this way is known as commutation and is well understood by experts familiar with this field.

The Current Demand could be a value or a set of values from which a target current in a coil or a set of coils can be computed. For example, in the case of N-phase machines, the Current Demand could correspond to a Q Current Demand from which individual Current Demand per phase could be computed by reference to the translator position relative to the stator. Therefore, for a machine with independently controlled coils, an aggregate Current Demand could be generated (e.g. relating to a required force output) from which individual Current Demand per coil could be computed by reference to the translator position relative to the stator.

Synchronisation Controller: A controller for a LPS incorporating a balanced pair of FPMs whose objective is to minimise the FPM Synchronisation Error. This may be desirable for a number of reasons, for example;

to reduce the net cyclic forces transmitted through the LPS and into surrounding structures and thereby reducing LPS noise and vibration and increasing LPS reliability and operating life.

Where two FPMs share a common LTFS (for example an opposed piston FPLG) to achieve a simultaneous and additional volume change of the working chamber within the common LTFS as a result of the synchronous motion the two FPMs, thereby achieving a controlled and consistent compression or expansion process.

Synchronisation Controller functions may be performed within the Future Stroke Controller or as a separate controller forming part of a FPM controller.

Logging, Analytics and Diagnostic Controller (Abbreviated "LAD controller"): A controller whose objectives may include (i) Providing raw data, and post-processed data and analytics from which the recent performance, present condition and expected remaining operating life of a LPS or constituent may be estimated and (ii) Reducing the risk of harm and system failure by identifying warning and fault conditions and generating control outputs such as Control Target Function Generator inputs; COPS Transition Conditions triggers; End of Stroke event triggers; or system shutdown commands.

The LAD controller may record multiple channels of raw data including COPS' data from the Future-Stroke Controller, measured Control Variables, measured Base Variable and other Sensor outputs. The LAD controller may record and process data from external sources, for example environmental, local, and vehicle-to-vehicle data.

Post processing and analytical methods may include historical data trend analysis, threshold analysis, histogram analysis, Statistical Process Control, and advanced pattern identification and recognition analysis techniques commonly applied within the emerging fields of Artificial Intelligence. Such trend and pattern analysis may indicate a change in performance over multiple strokes due to factors such as thermal transients, wear, corrosion, deposition, fatigue, material embrittlement, fuel variation, and dynamic environmental factors external to the system.

The LAD Controller may provide raw data, post-processed data and/or analytic results (Abbreviated "LAD") to the Future Stroke Controller and/or to the In-Stroke Controller, to a local or remote storage or decision-making function, and may record or transmit system fault alerts, system status warnings or other system updates on the basis of these functions.

Control Parameter Set (Abbreviated "COPS"): A set of control functions and/or control parameters used by the In-Stroke Controller comprising CVt(BV) and one or more of ST(BV,CV), QFF(BV,CV), FBT(BV,CV) and CTC.

Next Control Parameter Set (Abbreviated "COPS'"): A set of functions used by the In-Stroke Controller during a future stroke once a COPS Transition Condition is met, and comprising CVt(BV)' and one or more of ST(BV,CV)', QFF(BV, CV)', FBT(BV,CV)' and CTC'.

COPS Transition Conditions (Abbreviated "CTC"): A set of logical conditions applied by the In-Stroke Controller to determine when to replace COPS with COPS'. These may include for example (i) A cumulative number of strokes for which COPS have been used (ii) Defined limiting values of a Base Variable (iii) Defined limiting values of a Control Variable or Control Variable Error (iv) A defined maximum cumulative duration (v) Other measures of system performance including system temperature, Synchronisation Error, or other input from a LAD Controller, Synchronisation Controller, Future-Stroke Controller, In-Stroke Controller, Current Controller or Sensor.

Base Variable (Abbreviated "BV"): A variable, typically FPM position or elapsed time, and which is typically measurable or calculable at any moment within the Present Stroke.

Measured Base Variable (Abbreviated "BVm"): A measured value of a Base Variable derived from one or more Sensors.

Control Variable (Abbreviated "CV"): A measureable or calculable variable which is indicative of FPM motion, LPS performance (For example FPM position, FPM velocity, FPM acceleration, working chamber pressure, working chamber inlet/discharge flow rate or working fluid temperature) or LPS state (For example, Total System Energy comprising FPM kinetic energy plus other forms of energy stored in the LEMS and LTFS at a given moment), which may be influenced by electrical current applied to the LEM, and which is typically measurable at any moment within the Present Stroke.

Target Control Variable (Abbreviated "CVt"): A target value for a Control Variable at any moment within a Stroke whose value is a function of a Base Variable at that moment. A Target Control Variable is typically a set point or demand input for an In-Stroke Controller.

Measured Control Variable (Abbreviated "CVm"): A measured value of a Control Variable derived from one or more Sensors.

Target Control Variable Function (Abbreviated "CVt(BV)"): A deterministic function that permits at least one Target Control Variable to be determined at any moment by reference to at least one Measured Base Variable. A CVt(BV) function may be expressed in number of forms, for example (i) as a tabulated set of BV values and corresponding CV values from which a Target Control Variable can be looked up with reference to a Measured Base Variable, (ii) a mathematical formula or algorithm, (iii) a simulation model of the LPS. In each case the function provides a logical and deterministic mapping of at least one Measured Base Variable to at least one Target Control Variable during the Present Stroke.

Control Variable Error (Abbreviated "CVe"): A difference between target and measured values of a Control Variable (i.e. [CVm−CVt] or [CVt−CVm]) at any moment within the Present Stroke.

Start of Stroke (Abbreviated "SOS"): The event corresponding to the End of Stroke event of the previous stroke.

End of Stroke (Abbreviated "EOS"): An event when either a Stroke Transition Threshold Condition or a Stroke Transition Trigger Condition has been met.

Stroke Transition Threshold Condition: The condition when a measured Base Variable equals the Stroke Transition Threshold value or a measured Control Variable equals a Stroke Transition Threshold value.

Stroke Transition Trigger Condition: An alternative Stroke Transition condition in which a Stroke Transition is caused by a trigger signal or event external to the In-Stroke Controller, for example a Synchronisation Trigger (Abbreviated "STR") from a Synchronisation Controller or a Diagnostic Trigger (Abbreviated "DTR") from a LAD Controller.

Stroke Transition Threshold value (Abbreviated "ST"): A threshold value of a Base Variable or a Control Variable which is used by a Stroke Transition Control step within the In-Stroke Controller to determine an End of Stroke event.

Stroke Threshold Function (Abbreviated "ST(BV,CV)"): A deterministic function that permits at least one Stroke Transition Threshold value to be determined at any moment by reference to at least one Measured Base Variable and/or Measured Control Variable. A ST(BV,CV) function may be expressed in number of forms, for example (i) as a tabulated set of ST values and corresponding CV and/or BV values from which a ST can be looked up with reference to a Measured Base Variable and/or Measured Control Variable Values, (ii) a mathematical formula or algorithm, (iii) a simulation model of the LPS. In each case the function provides a logical and deterministic mapping of at least one Measured Base Variable or Measured Control Variable to at least one Stroke Transition Threshold value during the present stroke.

Next Target Control Variable Function (Abbreviated "CVt (BV)'"): A Target Control Variable Function as determined by the Future-Stroke Controller to be used by the In-Stroke Controller during a future stroke.

Next Stroke Threshold Function (Abbreviated "ST(BV, CV)'"): A Stroke Threshold Function as determined by the Future-Stroke Controller to be used by the In-Stroke Controller during a future stroke.

Feed Forward Current Function (Abbreviated "QFF(BV, CV)"): A deterministic function that permits at least one Feed Forward Current value to be determined at any moment by reference to at least one Measured Base Variable and/or Measured Control Variable. A QFF(BV,CV) function may be expressed in number of forms, for example (i) as a tabulated set of QFF values and corresponding CV and/or BV values from which a QFF value can be looked up with reference to a Measured Base Variable and/or Measured Control Variable Values, (ii) a mathematical formula or algorithm, (iii) a simulation model of the LPS. In each case the function provides a logical and deterministic mapping of at least one Measured Base Variable or Measured Control Variable to at least one Feed Forward Current value during the present stroke.

Next Feed Forward Current Function (Abbreviated "QFF (CV, BV)'"): A Feed Forward Term Function as determined by the Future-Stroke Controller to be used by the In-Stroke Controller during a future stroke.

Feedback Terms Function (Abbreviated "FBT(BV,CV)"): A deterministic function that permits at least one Feedback Term (For example, a proportional, integral or derivative gain term in a PID controller) to be determined at any moment by reference to at least one Measured Base Variable and/or Measured Control Variable. A FBT(BV,CV) function may be expressed in number of forms, for example (i) as a tabulated set of Feedback Terms values and corresponding CV and/or BV values from which Feedback Terms can be looked up with reference to a Measured Base Variable and/or Measured Control Variable Values, (ii) mathematical formula or algorithm, (iii) A simulation model of the LPS. In each case the function provides a logical and deterministic mapping of at least one Measured Base Variable or Measured Control Variable to at least one Feedback Term value during the present stroke.

Next Feedback Terms Function (Abbreviated "FBT(BV, CV)'"): A Feedback Terms Function as determined by the Future-Stroke Controller to be used by the In-Stroke Controller during a future stroke.

Current Demand (Abbreviated "Qt"): The target Current Demand output issued to a Current Controller, and is typically composed of the summation or other mathematical combination of Feedback Current Demand QFB and Feed Forward Current Demand QFF. By the target Current Demand output, we mean any signal that could be used to modulate the current in the coils, i.e. a voltage signal, a current signal, or any other appropriate electrical signal known to the skilled person.

Feedback Current Demand (Abbreviated "QFB"): A component of Current Demand Qt calculated within the In-Stroke Controller by summation or other mathematical combination of the output of at least one CV Feedback Controller.

Feed Forward Current Demand (Abbreviated QFF): A constituent of Qt calculated within the In-Stroke Controller using the Feed Forward Current Function QFF(BV,CV) with reference to a measured Base Variable and/or a measured Control Variable but typically without reference to the Control Variable Error Term.

Current Limit (Abbreviated "QCL"): An instantaneous peak or average peak current capacity limit inherent to the Current Controller or constituent such as a Current Switching Device, or of a coil within a LEM. When current flows in a positive direction and is measured with a positive value, the corresponding current limit also has a positive value and is termed the Positive Current Limit (Abbreviated "QCL+"). When current flows in a negative direction and is measured with a negative value, the corresponding current limit also has a negative value and is termed the Negative Current Limit (Abbreviated "QCL−").

Current Demand Control Margin (Abbreviated "QCM"): The smallest absolute difference between the Current Demand and the Current Limit, i.e. the smaller of [QCL+ minus Qt] and [Qt− QCL−]. When the Current Demand Control Margin is less than or equal to zero the Current Controller is said to be saturated. In this condition circuit protection functions of the Current Switching Device may limit LEM coil current to QCL+ or QCL−, and small changes in Qt may have little or no impact on current flowing in the LEM coil or coils. As a result, the In-Stroke Controller is not able to modulate the force acting on the FPM until QCM rises above zero. It should therefore be recognised that maintaining a positive Current Demand Control Margin is an important function for the Future-Stroke Controller so that the In-Stroke Controller is able to exert control over piston motion continuously throughout each stroke of the FPM.

Lead FPM: In LPS incorporating a balanced pair of FPMs, the lead FPM is that which reaches its Stroke Transition Threshold Condition first. In an ideal and perfectly balanced system, each LEMS and each LTFS within the LPS would be physically identical, each FPM would be controlled by equivalent FPM controllers through the application of identical COPS, and each FPM would reach each Stroke Transition Threshold Condition simultaneously. In a non ideal system, small physical differences between each pair of LEMS and LTFS systems may result in different forces acting on each FPM as a result of which one FPM reaches its Stroke Transition Threshold Condition before the other. For example, in a FPLG system having two separate combustion chambers acting on two separate FPMs, differences in the timing and completeness of combustion processes in each combustion chamber may result in different forces acting on each FPM.

Lagging FPM: In a LPS incorporating a balanced pair of FPMs, the lagging FPM is that which as not reached its Stroke Transition Threshold Condition when the Lead FPM reaches its Stroke Transition Threshold Condition.

FPM Synchronisation Error (Abbreviated "SE", "$SE_{CV}$" or "$SE_{BV}$"): Either of (i) the difference between a measured Control Variable of a Lead FPM and the corresponding measured Control Variable of a Lagging FPM in a LPS incorporating a balanced pair of FPMs, each measured at the moment when the Lead FPM reaches its End of Stroke event, termed $SE_{CV}$, or (ii) the difference between a measured Base Variable of a Lead FPM and the corresponding measured Base Variable of a Lagging FPM in a LPS incorporating a balanced pair of FPMs at the moment when the Lead FPM reaches its End of Stroke, termed $SE_{BV}$.

Sensor: A device that measures a Base Variable (for example position or time), a Control Variable (for example, position, velocity, acceleration or pressure) or another variable indicative of or influencing system performance (for example temperature) and that generates an electrical signal. Examples of sensor devices include linear encoders (including optical, magnetic and hall-effect types), rotary encoders (including optical, magnetic and hall-effect types), accelerometers, pressure sensors and proximity devices (including capacitive, inductive or optical types). For the purposes of this definition a system clock that measures or reports an elapsed time or absolute time signal to the In-Stroke Controller may be also be regarded as a Sensor.

Sensor Controller: A device that receives, processes, converts or transmits an electrical signal from a Sensor.

Gate Controller: A device that applies a voltage to a power switching device such as an Insulated Gate Bipolar Transistor (IGBT), a Field Effect Transistor (FET), a Triode for Alternating Current (TRIAC), a Solid State Relay (SSR) or other type of electrical power relay.

Integrated Gate and Sensor Controller: A device that combines the functions of a Gate Controller and a Sensor Controller.

According to the present invention there is provided a method of controlling a Free Piston Mover, the method comprising the steps of: generating a Control Parameter Set for the closed loop control of a Target Control Variable, this set comprising a Target Control Variable Function together with one or more of:
- a Stroke Threshold Function;
- a Feed Forward Current Function;
- a Feedback Terms Function;
- Control Parameter Set Transition Conditions;

transmitting the Control Parameter Set to an In-Stroke Controller in advance of the start of a Stroke to be controlled; modifying one or more of the constituents of the Control Parameter Set for a subsequent Stroke of the Free Piston Mover using a Future-Stroke Controller; and transmitting the modified Control Parameter Set to the In-Stroke Controller for the control of any Future Stroke.

The present invention is, by contrast to EP1740804, a Future-Stroke Controller for a Free Piston Mover which adapts the Control Parameter Set for future strokes of the FPM to respond to Input Demand signals whilst ensuring a sufficient Current Control Margin is maintained and to compensate for system changes over time.

Key benefits which the present invention can provide in multiple Linear Power Systems applications include:
- Improved efficiency
- Reduced vibration
- Shorter start-up times
- Longer operating life
- Reduced maintenance costs
- Reduced emissions in FPLG applications
- Fuel flexibility in FPLG applications These are realised by ongoing adaptations applied to the Control Parameter Set that is used by the In-Stroke Controller. These adaptations are calculated and generated by the Future-Stroke Controller to compensate for changes to LPS system characteristics and inputs over time such as:
- Input demand signal variations
- Thermal transients
- Wear, corrosion, embrittlement, surface depositions and other forms of material or surface degradation
- Other environmental factors including for example external acceleration and vibration loads and electromagnetic noise impacting the performance of Sensors and control systems
- In a FPLG, variations in fuel composition
- In a FPLG, variations in conditions within the combustion chamber including wall temperatures, charge air temperature, in-cylinder charge motion, fuel/air equivalence ratio, fuel/air mixing and the proportion of burned and unburned residual exhaust gas present in the chamber from previous cycles In a multi-FPM system, reduced vibration is achieved through improved synchronisation of balanced FPM motion. This result is achieved through adaptive adjustments made by the Future-Stroke Controller to the Next Control Parameter Set including adjustments made to the Next Target Control Variable Functions of each FPM controller to correct for Synchronisation Errors.

In a number of types of LPS product incorporating one of more FPMs, FPM motion during a stroke may be acted upon by forces exhibiting non-linear variation, that is to say that the forces do not vary linearly with FPM position or with time. Examples of forces exhibiting non-linear variation include;
- Electromagnetic cogging forces generated by the LEMS within the LPS
- Friction forces associated with linear bearings and seals within the LEMS
- Gas forces within the LTFS within the LPS as a result of valve opening and closing events
- In the case of a FPLG, gas forces arising due to combustion reactions In such cases these non-linear forces may be composed of
- a significant proportion that is substantially the same from one cycle to the next and which is predictable based on measurement of variables during one or more previous Strokes and/or by simulation of processes within the LPS, and;
- a smaller proportion that is substantially unpredictable and typically varies as a result of complex and/or chaotic processes within the LTFS (For example, cycle-to-cycle combustion variations within a FPLG)

It is well known by persons skilled in the field of control methods that control of systems exhibiting non-linear behaviour is challenging for many types of controller. For example a PID controller may tend to generate an undershoot or overshoot control response due to the large error terms arising due to a non-linear variation of a control variable.

The adaptive control method applied by the Future-Stroke Controller improves the FPM motion control precision and reduces the tendency of the In-Stroke controller to produce and undershoot or overshoot control response. This is preferably achieved through the use of Feed Forward Current Demand term by the In-Stroke controller, which represents a close approximation for total Current Demand required for the desired motion profile and leaves a smaller proportion of the Current Demand to be met by the CV Feedback Controller within the In-Stroke Controller. The Feed Forward Current Demand is determined by the Feed Forward Current Calculation step within the In-Stroke Controller with reference to a measured Base Variable and/or measured Control Variable and a Feed Forward Current Function. The Feed Forward Current Function is, in turn, generated by a Feed Forward Current Function step within the Future-Stroke controller based on Feedback Current demand generated in previous strokes by the In-Stroke controller. Through this adaptation the Feed Forward Current Function is adjusted over the course of multiple strokes to closely reflect the deterministic and predictable proportion of Current Demand that is necessary to achieve a given FPM motion profile. The remaining unpredictable proportion of the required Current Demand is typically smaller and more linear in nature, and can therefore be more accurately generated by the CV Feedback Controller within the In-Stroke Controller.

The control method and apparatus of the present invention defines an approach to control of a FPM mover to precisely control its motion during a series of Strokes (for example defined by its velocity trajectory at a given time or position through a Stroke) to achieve optimal system performance of the LPS, by modulating the electromagnetic force applied to the FPM. This is applicable for a wide range of LPS applications. whether or not there exists a periodic combustion event within a LTFS.

It is therefore expressly asserted that whilst a number of these aforementioned advantages are specific to FPLG applications due to the non-linear native of the control challenge for LTC, the present invention is applicable and beneficial in a wide range of LPS applications including those examples provided in this specification.

The method may further comprise the steps of:
sampling a Base Variable indicative of Free Piston Mover performance during a Stroke following the generation of the Control Parameter Set;

generating at least one Target Control Variable using the measured Base Variable with reference to a Target Control Variable Function; and determining at least one Control Variable Error using the measured Control Variable and the Target Control Variable.

The method may further comprise the step of generating a Current Demand output which is input to a Current Controller using the Control Variable Error.

The method may further comprise the steps of:

sampling a second Base Variable indicative of a second Free Piston Mover performance;

generating at least one second Target Control Variable using the measured second Base Variable with reference to a second Target Control Variable Function;

determining at least one second Control Variable Error using the measured second Control Variable and the second Target Control Variable;

generating a Current Demand output which is input to a second Current Controller using the second Control Variable Error; and modifying the second Target Control Variable Function for a future stroke of the Free Piston Mover using a Future-Stroke Controller which may affect the next stroke or any future stroke.

Further steps may include:

measuring a FPM Synchronisation Error reflecting a difference between a measured Control Variable or measured Base Variable of the second mover and the equivalent measured Control Variable or measured Base Variable of a first mover when a measured variable of either or both mover has become equal to a predefined Stroke Transition Threshold value;

providing a Demand Input;

wherein the Future-Stroke Controller modifies the Control Parameter Set for a subsequent stroke for at least one of the Free Piston Movers based on at least one of:

the measured current, the Current Demand, the FPM Synchronisation Error, the Demand Input.

The Target Control Variable Function may be an array of Base Variable and Target Control Variable values from which a Target Control Variable can be looked up by reference to the array element corresponding to a measured Base Variable.

Target Control Variable Function values for a present stroke and at least one subsequent stroke may be stored in a common array.

The Target Control Variable Function May be a mathematical formula from which the Target Control Variable can be calculated by applying the measured Base Variable.

The Target Control Variable Function may be a simulation model from which the Target Control Variable can be determined by inputting the measured Base Variable.

The second Target Control Variable Function may be an array of Base Variable and Target Control Variable values from which a second Target Control Variable can be looked up by reference to the array element corresponding to a measured second Base Variable.

The second Target Control Variable Function may be a mathematical formula from which the second Target Control Variable can be calculated by applying the measured second Base Variable.

The second Target Control Variable Function may be a simulation model from which the second Target Control Variable can be determined by inputting the measured second Base Variable.

The Future-Stroke Controller may receive input from a Synchronisation Controller for the two Free Piston Movers.

The synchronisation modifications to the first and second Target Control Variable values may be opposite in direction. The synchronisation modifications to the first and second Target Control Variables may be equal in magnitude.

The method may further comprise the step of recording a measurable output of one or more of the Free Piston Movers, In-Stroke Controllers and Future-Stroke Controllers.

The method may further comprise the step of monitoring the historic stroke trends using a diagnostic controller.

The method may further comprise the step of checking the validity of an operational licence associated with any controller and taking an action including but not limited to restricting operation or alerting if the licence is invalid.

The method may further comprise the step of communicating data indicative of a usage metric to an accounting method.

The Feed Forward Current Function may comprise Feed Forward Current Demand values for a range of Base Variable values or for a range of Control Variable values.

The Current Demand may be calculated for the measured Base Variable by addition of at least one Feedback Current Demand value and one Feed Forward Current Demand value.

The Future-Stroke Controller may adjust the Feed Forward Current Function for a future stroke by adding a proportion of the Feedback Current Demand value corresponding to one or more measured Base Variable values to the Feed Forward Current Demand values associated with each measured Base Variable value by the Feed Forward Current Function.

The In-Stroke Controller may operate at a computational loop rate at least two times the computational loop rate of the Future-Stroke Controller.

The invention also provides a system or device for controlling a free-piston mover for conducting a method according to any of the above description, the system or device comprising:

a Current Controller, an In-Stroke controller and a Future-Stroke controller, the Current Controller including at least one Gate Controller for controlling at least one circuit switching element such as an Insulated Gate Bipolar Transistor (IGBT), a Field Effect Transistor (FET), a Triode for Alternating Current (TRIAC), a Solid State Relay (SSR) or other type of electrical power relay.

The computational loop rate within the In-Stroke Controller may be at least two times the computational loop rate within of the Future-Stroke Controller.

The Gate Controller and Current Feedback Controller may be co-located, or may be physically separated and linked by a serial communication means including but not limited to one or more of:

single ended switched unidirectional or bidirectional electrical circuit(s);

differential switched unidirectional or bidirectional electrical circuit(s); or one or more optical fibres and associated transceivers.

The Gate Controller may additionally comprise at least a de-serialiser and gate switching circuits.

The Gate Controller may additionally comprise one or more Sensor Controllers or Sensors.

There may be provided a computer program comprising computer program code means adapted to perform a method as described above when said program is run on a programmable microcomputer.

There may be provided a computer program comprising computer program code means adapted to perform a method as described above when said program is run on a programmable microcomputer, and adapted to be downloaded to a system according to a system of device as described or one of its components when run on a computer which is connected to the internet.

There may be provided a computer program product stored on a computer readable medium, comprising a computer program as described above.

BRIEF DESCRIPTION OF THE FIGURES

The present invention will now be described by way of example with reference to the accompanying drawings, in which:

FIG. 11 illustrates a table form of a Target Control Variable Function CVt(BV)

FIG. 12 illustrates a table form of a Stroke Threshold Function ST(BV,CV)

FIG. 13 illustrates a table form of a Feed Forward Current Function QFF(BV,CV)

FIG. 14 illustrates a table combining table forms of CVt(BV), ST(BV,CV), QFF(BV,CV)

DESCRIPTION OF THE FIGURES

Figure 1:
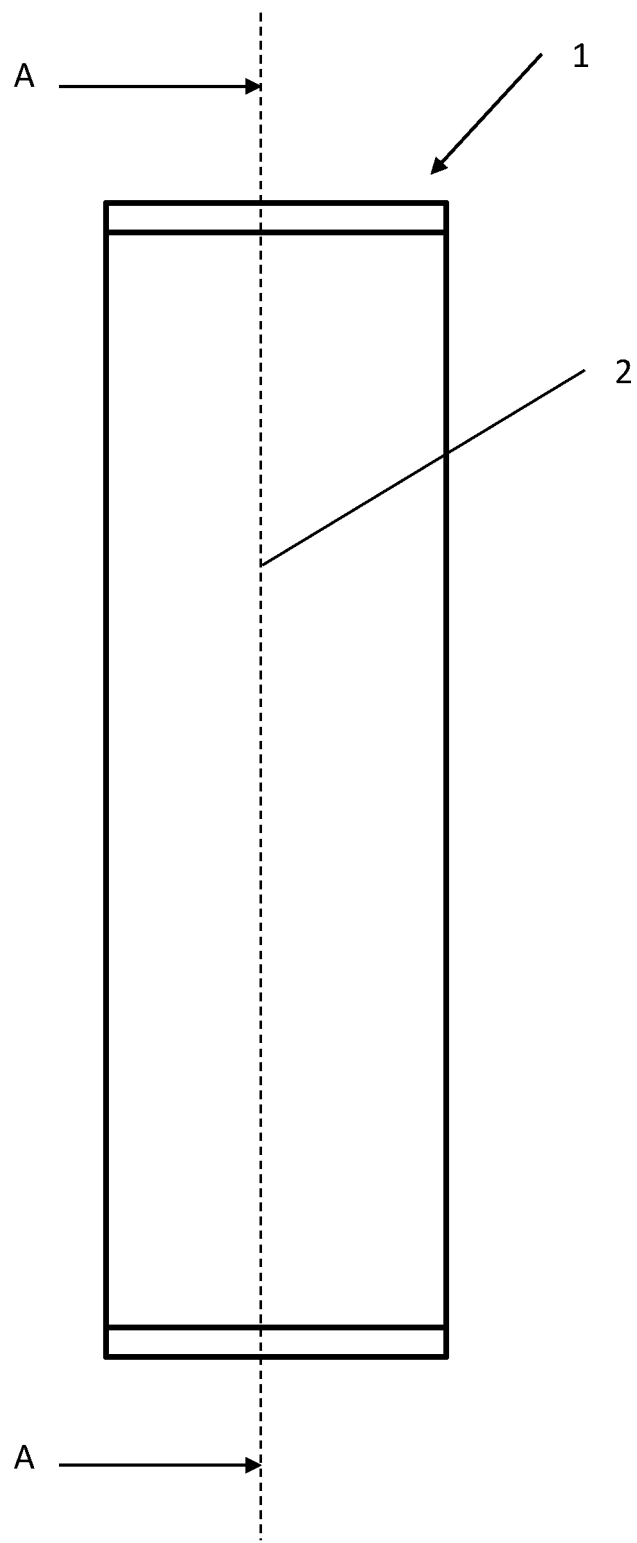
FIG. 1 is an external view of an example of a LPS showing section plane AA
Figure 2:
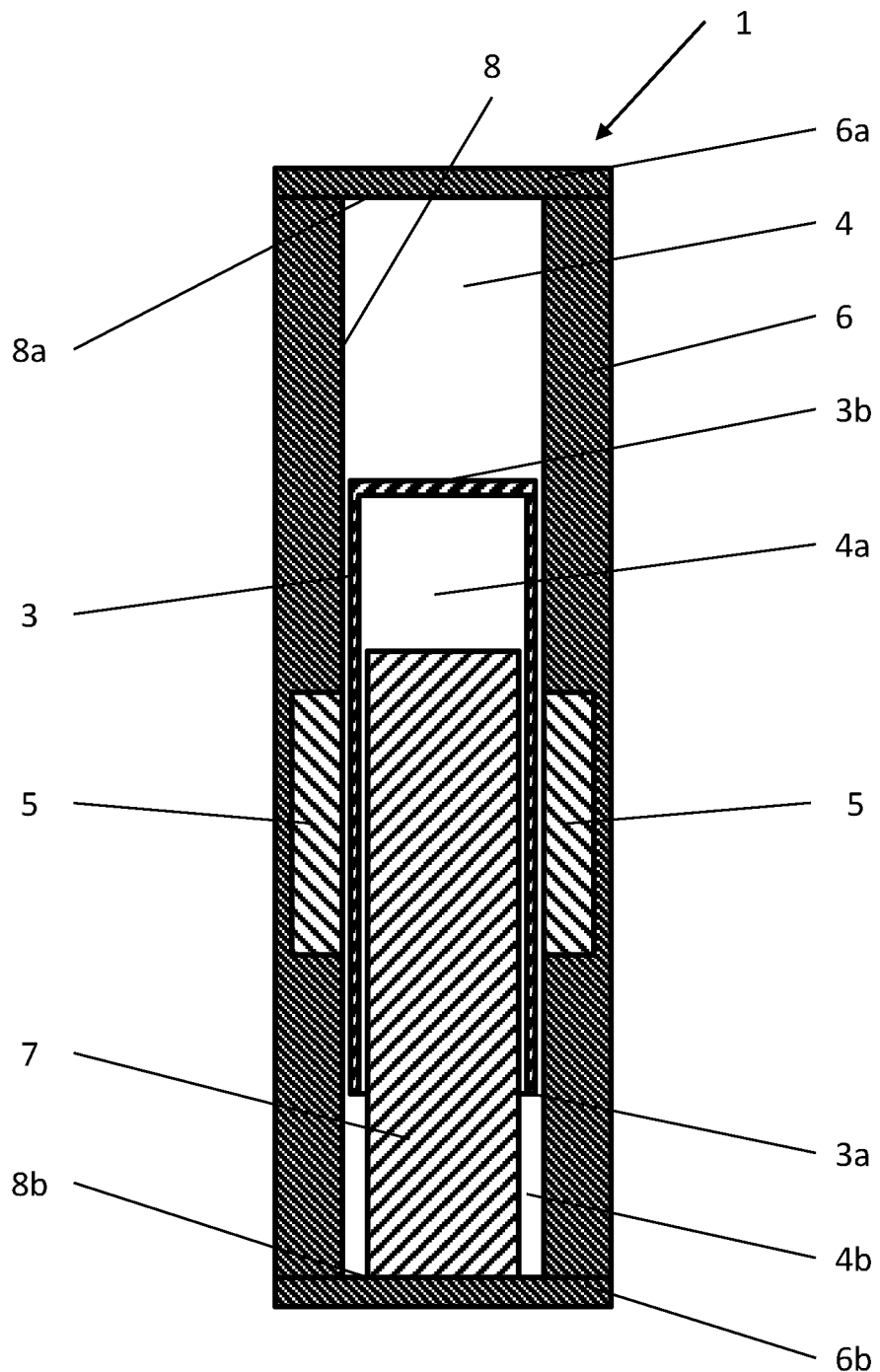
FIG. 2 is Section AA showing the FPM and key features of the LEMS and LTFS

FIG. 1 is a simplified external view of the mechanical assembly of an example of a Linear Power System 1, showing the Free Piston Mover motion axis 2 and section plane AA FIG. 2 is a section view through plane AA showing the Free Piston Mover 3 and key features of the LEMS and LTFS within the LPS example depicted in FIG. 1, including the working chamber 4 of the LTFS. Many alternative LPS implementations are possible, each comprising at least one LEMS and one LTFS. The LEMS includes a Stator 5, and a LPS housing 6 defining a working cylinder 8. The ends of the LPS housing in this example are closed by housing end components 6a, 6b.

The FPM 3 acts as the translator of the LEMS. In the example shown the FPM 3 is open at one end 3a to allow it to pass over a fixed central core 7 whilst moving within a surrounding cylinder 8 of the LPS housing 6. In this example the FPM 3 is closed at one end 3b so that a working chamber 4 is formed within the cylinder 8, and between the cylinder end wall 8a of the LPS housing end 6a and the closed end 3b of the FPM 3.

In a LPS application such as a Free Piston Linear Generator (also known as a Free Piston Engine) or Free Piston Gas Expander, the working chamber 4 may be used to apply a force on the closed end 3b of the FPM 3 by combustion, by introduction of a high pressure gas, or by a phase change. The associated features that may be included within these types of LPS (for example fuel and air supply, valves and ignition features) are not shown for clarity.

In the example embodiment shown in FIGS. 1 and 2, two further volumes 4a, 4b are defined between the central core 7 and the FPM 3, and at the end of open end of the FPM 3a. Each may each act as a bounce chamber in which changes in pressure within these chambers 4a, 4b caused by the movement of the FPM 3 result in the exchange of energy between the kinetic energy of the FPM 3 and energy stored in the compressed gas within the bounce chambers 4a, 4b.

The FPM 3 is formed to include one or more magnetically permeable or magnetised elements (not shown) which interact with Stator 5 to influence the current flowing within the Stator 5 and produce or vary a linear electromagnetic force acting on the FPM 3.

When the LPS 1 acts as a type of linear motor or actuator, electrical power input to the Stator 5 causes motion of the FPM 3. When the LPS 1 acts as a type of linear generator, electrical power output from in the Stator -(5-) is caused by motion of the FPM 3.

When the working chamber 4 acts as a combustion chamber converting fuel energy into mechanical work acting upon the FPM 3, the performance of the LPS depends on the timing, speed and completeness of the combustion reaction and the resulting emissions remaining in the working fluid following this reaction. The system performance of the LPS according to these characteristics depends critically on the profile of the linear motion of the FPM 3 with time.

A motion controller is therefore required to control the linear motion of the FPM 3 with time.

Figure 3:
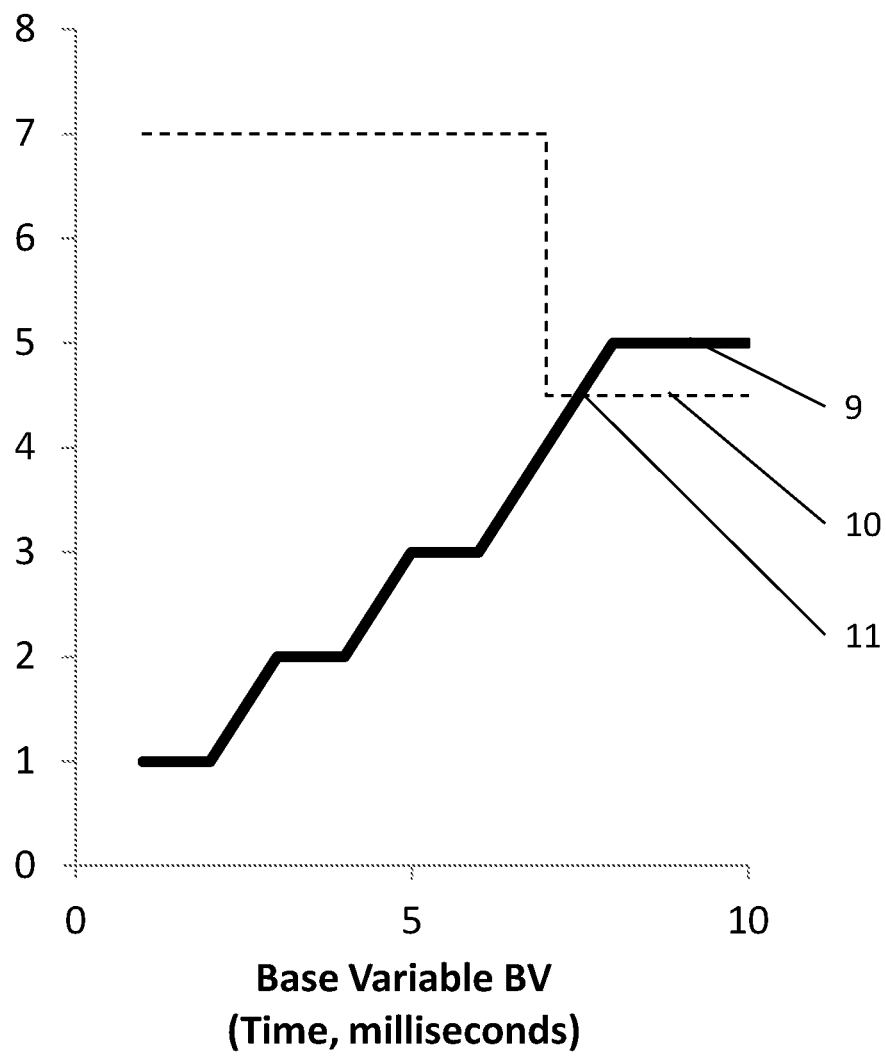
FIG. 3 illustrates a FPM stroke where BV is elapsed time and CV is position
Figure 4:
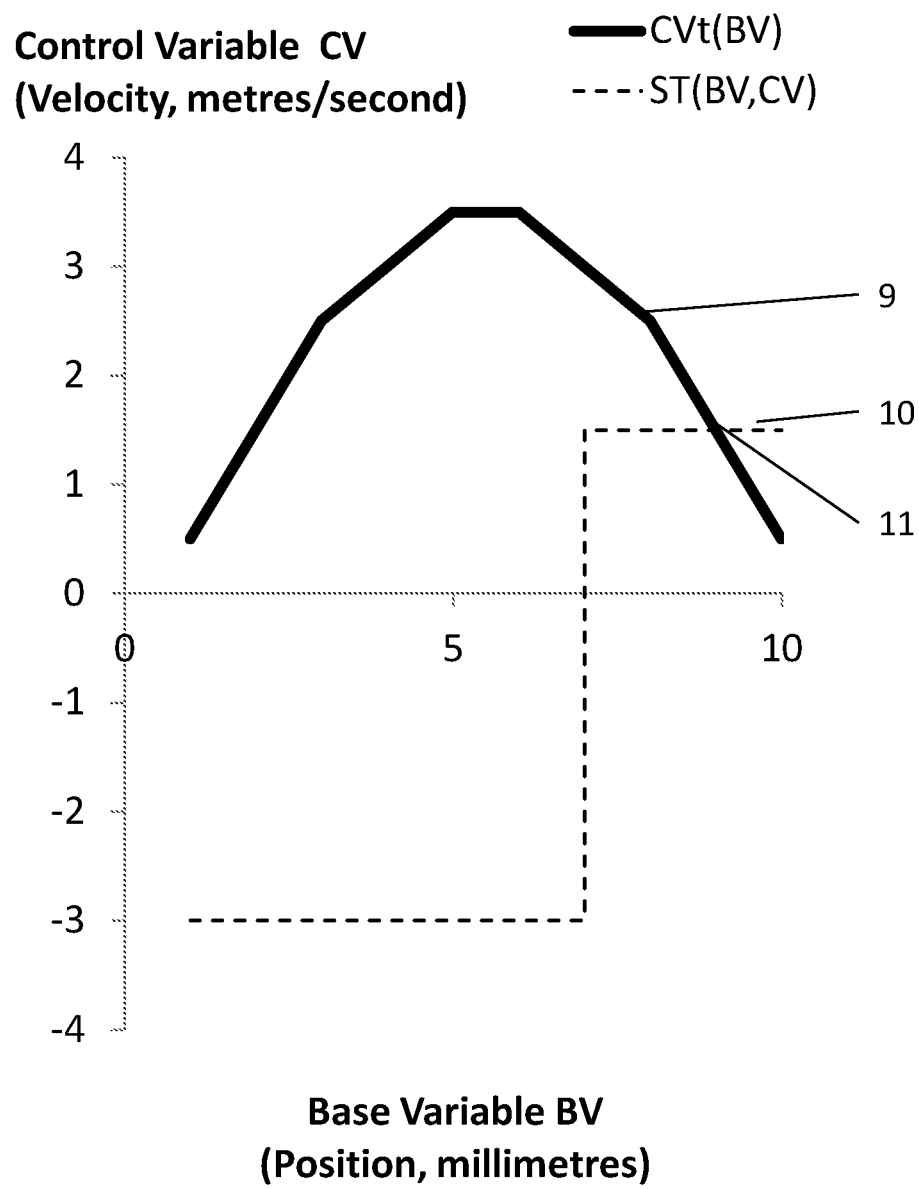
FIG. 4 illustrates a FPM stroke where BV is position and CV is velocity

FIGS. 3 and 4 illustrate how a Base Variable (such as time or position) and a Control Variable (such as position or velocity) associated with a Base Variable may vary with FPM motion, and may have an associated profile that may be described as a Target Control Variable Function CVt (BV). In FIG. 3 the Base Variable is time and the Control Variable is position. In FIG. 4 the Base Variable BV is position and the Control Variable CV is velocity.

A Target Control Variable Function CVt(BV) may be used to generate a Target Control Variable CVt from a measured values of the Base Variable BVm. The loci of CVt values determined from Target Control Variable Functions CVt (BV) with reference to measured values BVm are illustrated in FIGS. 3 and 4 as solid lines 9.

In both FIGS. 3 and 4 the dashed lines 10 represent the loci of Stroke Transition Threshold values determined in each example from a Stroke Threshold Function ST(BV,CV) 10 with reference to measured values BVm. In the examples shown in FIGS. 3 and 4, Stroke Transition Threshold values have the same units as measured Control Variable values and Stroke Transition Threshold Conditions 11 occur when a measured Control Variable CVm is equal to a Stroke Transition Threshold value ST.

In an alternative embodiment of Stroke Threshold Function ST(BV,CV), Stroke Transition Threshold values have the same units as Base Variable values. Stroke Transition Threshold values ST are determined from a Stroke Threshold Function ST(BV,CV) (10) with respect to measured Control Variable values CVm and Stroke Transition Threshold Conditions 11 occur when a measured Base Variable BVm is equal to Stroke Transition Threshold value ST.

Figure 5:
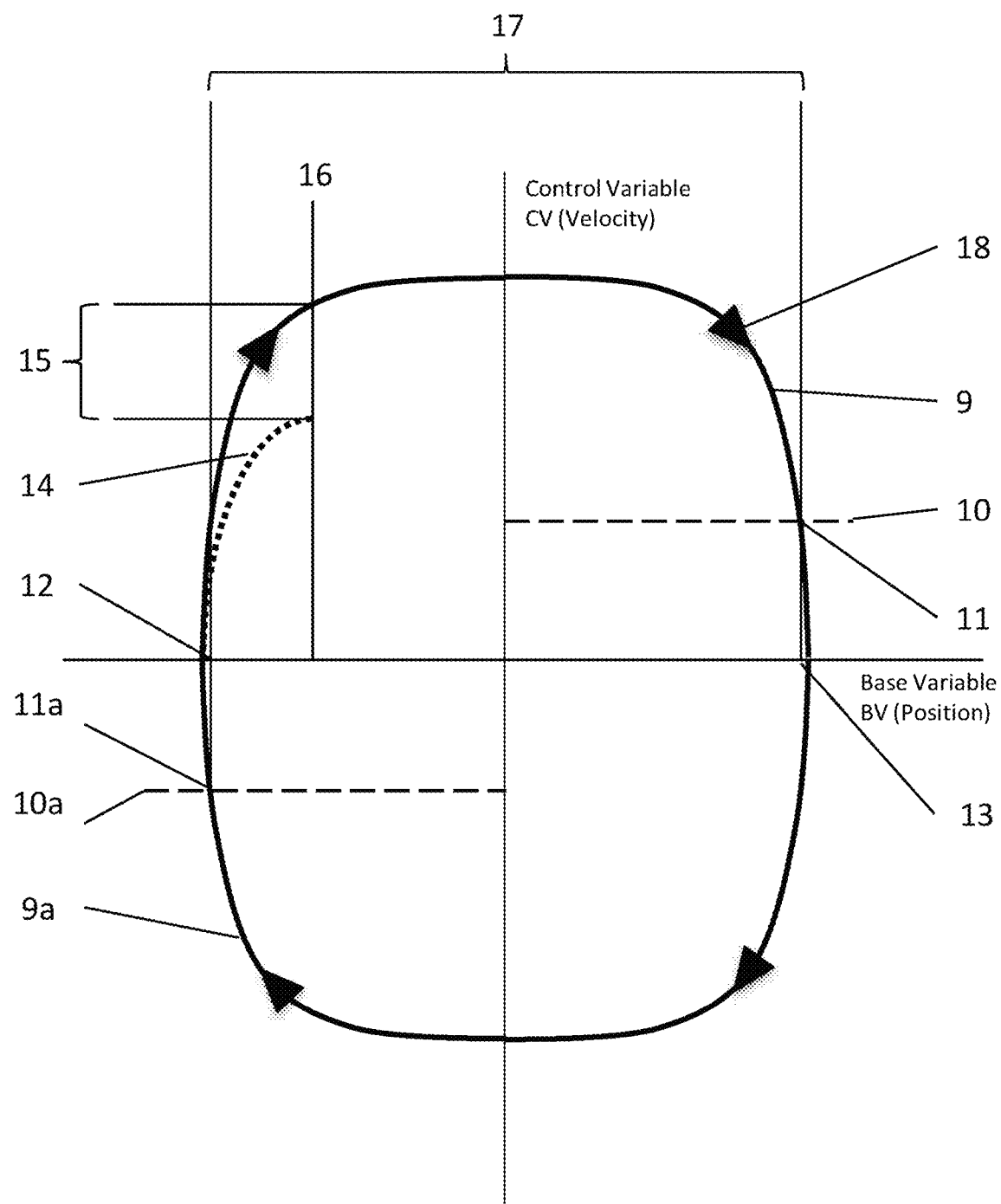
FIG. 5 illustrates a FPM two-stroke cycle where BV is position and CV is velocity

FIG. 5 illustrates a first Target Control Variable Function CVt(BV) 9 and next Target Control Variable Functions CVt(BV)' 9a together forming a complete cycle in this example. The values of BV at the Start of Stroke event 12 and End of Stroke event 13 are indicated, corresponding in this example to consecutive Stroke Transition Threshold Condition events 11 and 11a determined in relation to Stroke Threshold Functions 10, 10a.

FIG. 5 also shows the measured path of FPM motion represented by dotted line 14 depicted in terms of measured Control Variable and measured Base Variable values, and illustrating a divergence of the measured path of FPM motion 14 from the locus of the Control Variable Target Function CVt(BV) 9. This divergence results in a Control Variable Error CVe 15 illustrated for the measured Base Variable BVm1 16 within the Stroke 17.

For clarity, the clockwise direction of progression of FPM motion with time around the illustrated cycle is indicated by arrowhead marks 18

Figure 6:
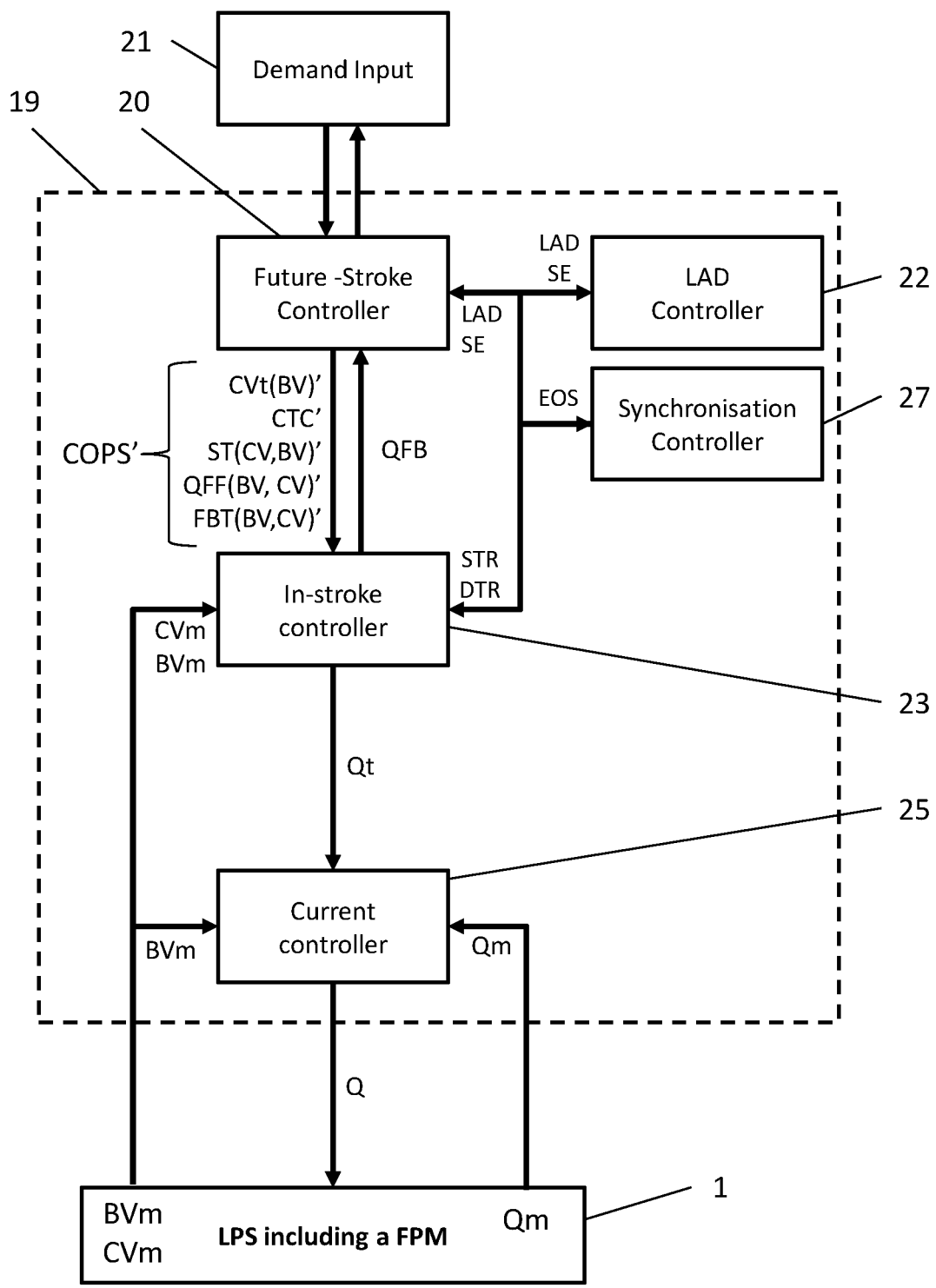
FIG. 6 is a schematic of a control system for a Free Piston Mover within a LPS

FIG. 6 is a schematic representation of a control system for a Free Piston Mover 19 according to the present invention and which incorporates a Future-Stroke Controller 20. In this example embodiment, the Future-Stroke Controller 20 receives signals from a Demand Input source 21, from a Logging, Analytics and Diagnostic Controller 22 and from a Synchronisation Controller 27. In addition, the Future-Stroke Controller receives feedback current QFB signals from an In-Stroke Controller 23.

The Demand Input could be generated by an end user of the LPS, or for example by another automated controller such as an Engine Control Unit (ECU) or hybrid vehicle Powertrain Control Unit (PCU). In this case the Future Stroke Controller 20 may periodically issue status signals to the Demand Input controller indicating operational readiness or other inputs required or utilised by the Demand Input controller.

FIG. 6 also illustrates a Logging, Analytics and Diagnostic controller 22 for monitoring, logging, aggregating and communicating or reporting any system parameters including but not limited to Base Variables whether or not used for control, Control Variables (targets and/or measured) as well as trends, environmental sensor inputs and run-time metrics such as for the number of strokes and/or hours of operations, number of cold starts, errors or failures, and metrics as may be required for billing for a service or ensuring compliance with licensed use obligations.

The Future Stroke Controller 20 periodically issues to the In-Stroke Controller 23 a set of outputs referred to as the Next Control Parameter Set (COPS') and comprising a next Target Control Variable Function CVt(BV)' together with one or more of;

A set of Next COPS transition conditions CTC'
A Next Stroke Threshold Function ST(BV,CV)'
A Next Feed Forward Current Function QFF(BV,CV)'
A Next Feedback Terms Function QFB(BV,CV)'

Each of these outputs may be generated independently using inputs to the Future-Stroke Controller or may be based on previous versions of these outputs, modified using inputs to the Future-Stroke Controller.

The Future-Stroke Controller may generate one of more constituents of the Next Control Parameter Set with reference to multi-stroke historic and trend analysis data provided by a Logging, Analytics and Diagnostics controller 22, and/or with reference to a Synchronisation Error SE provided by a Synchronisation Controller 27.

The In-Stroke Controller 23 uses the Next Control Parameter Set, together with measured values of the Base Variable BVm and Control Variable CVm to determine a Current Demand output Qt that is issued as an input to a Current Controller 25. The In-Stroke Controller 23 may operate as a Reduced Authority Controller or Low Authority Controller (LAC).

The Current Controller 25 uses the Current Demand output Qt together with measured values of the Base Variable BVm and measured current values Qm to control the set of current values Q that flow in each coil or phase of one or more Linear Electrical Machine Stator within the LPS 1, and which may comprise a number of discrete and independent current values according to the number of coils and phases that exist within the LPS 1.

The set of currents Q results in FPM motion and output from the LPS 1 that is intended to satisfy the external Demand Input 21 and contribute to optimal system performance of the LPS 1.

Figure 7:
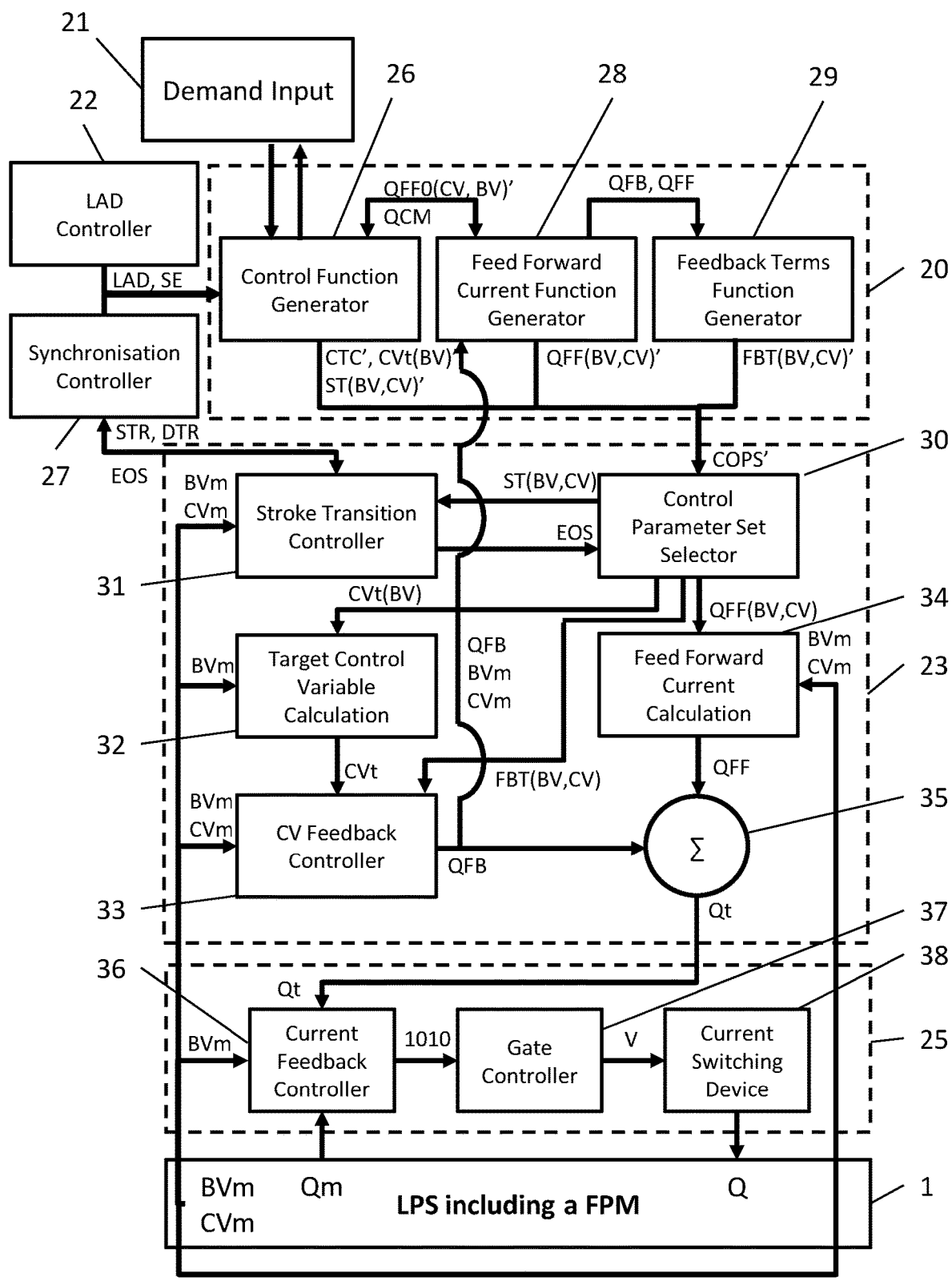
FIG. 7 is a schematic showing additional detail of constituent controllers within a control system for a Free Piston Mover within a LPS

FIG. 7 shows additional detail within constituent controllers within a control system for a Free Piston Mover, comprising
a Future-Stroke Controller 20
a Logging, Analytics and Diagnostics Controller 22
a Synchronisation Controller 27
an In-Stroke Controller 23
a Current Controller 25

Within the Future-Stroke Controller 20 a Control Target Function Generator 26 generates the next Target Control Variable Function CVt(BV)', the Next Stroke Threshold Function ST(BV,CV)' and a set of Transition Conditions (CTC') determining when the Next Control Parameter Set will be used by the In-Stroke Controller. The Control Target Function Generator takes input from the Demand Input 21, a Synchronisation Controller 27 and a Logging, Analytics and Diagnostic controller 22.

The Control Target Function Generator 26 within the Future-Stroke Controller 20 may also receive Current Limit Control Margin QCM values from the present stroke from the In-Stroke Controller 23 or may calculate these values from QFB values provided by the In-Stroke Controller 23 or may calculate these values based on Qm values measured from the LPS. The Next-Stroke Controller 20 may adjust the Next Target Control Variable Function and other constituents of the Next Control Parameter Set in order to ensure a sufficient Current Limit Control Margin QCM is maintained during future strokes.

The Control Target Function Generator 26 may also generate a 'baseline' Next Feed Forward Current Function (Abbreviated "QFF0(BV,CV)'") corresponding to the expected current values that will be required to achieve the dynamic profile described by the Next Control Variable Target Function CVt(BV)', before adaptations are applied by a Feed Forward Current Function Generator 28.

The Future-Stroke Controller 20 may also include a Feed Forward Current Function Generator 28, which may take input from a Control Variable Feedback Controller 33 within the In-Stroke Controller 23 to generate an adapted Next Feed Forward Current Function QFF(BV,CV)', which is thereby modified in response to the operation of the In-Stroke Controller 23 over the course of multiple strokes. This modification may take the form of the addition of a proportion of QFB values to corresponding QFF terms within the Feed Forward Current Function QFF(BV,CV) for each set of QFB, BVm and/or CVm values that are together communicated by the Control Variable Feedback Controller 33 to the Feed Forward Current Function Generator 28.

The Future-Stroke Controller 20 may also include a Feedback Terms Function Generator 29, which may take input from the Feed Forward Current Function Generator 28 within the Future-Stroke Controller 20 to generate an adapted Next Feedback Terms Function FBT(BV,CV)', modified in to take account of changes in the Next Feed Forward Current Function QFF(BV,CV)' over the course of multiple strokes.

The Future-Stroke Controller 20 may generate one of more constituents of the Next Control Parameter Set by means of one or more control methods or processes utilising a Mean Value Model (MVM) based approach, MVM based approaches are well understood by persons skilled in the field, and typically neglect variations within each discrete stroke, instead and treating all processes and effects based on average values across one or more strokes.

The In-Stroke Controller 23 may include a Control Parameter Set Selector (30). Following an End of Stroke event the Control Parameter Set Selector 30 may replace the constituents of the Control Parameter Set presently used by the In-Stroke Controller 23 with corresponding constituents within the Next Control Parameter Set provided by the Future-Stroke Controller 20. This replacement may occur during the stroke following each End of Stroke event. Alternatively, this replacement may be executed after two or more strokes, following satisfaction of criteria set out in the COPS Transition Conditions presently in use by the In-Stroke Controller 23

A Stroke Transition Controller 27 uses the Stroke Threshold Function ST(BV,CV) with reference to a measured Base Variable BVm and/or a measured Control Variable CVm to determine the timing of End of Stroke events. The Stroke Transition Controller 27 may also determine the timing of an End of Stroke events based on a trigger event external to the In-Stroke Controller, for example a Synchronisation Trigger STR from a Synchronisation Controller or a Diagnostic Trigger DTR from a LAD Controller.

When the Stroke Transition Controller determines an End of Stroke event based on a Stroke Transition Trigger Condition or a Stroke Transition Threshold Condition, an End of Stroke signal EOS is sent to the Control Parameter Set Selector 30 and the Synchronisation Controller 27.

A Target Control Variable Calculation step 32 determines the Target Control Variable CVt based on a Target Control Variable Function CVt(BV) and with reference to a measured Base Variable BVm, and transmits one or more Target Control Variables CVt to a closed loop Control Variable Feedback Controller 33.

The CV Feedback Controller 33 calculates the QFB component of Current Demand Qt based on a Control Variable Error CVe, typically the difference between a Target Control Variable CVt and a Measured Control Variable CVm. The CV Feedback Controller 33 may be a 'Proportional-Integral-Derivative' (often referred to as a 'PID' controller) utilising Feedback Control Parameters generated from a Feedback Terms Function FBT(BV,CV). Alternatively the CV Feedback Controller may operate as one of several types of multiple-input multiple-output (MIMO) controller such as a state-space model based controller. In this way, two or more Target Control Variable Functions may be used in parallel to generate multiple QFB components of Current Demand Qt based on different measured Control Variables and/or measured Base Variables.

A Feed Forward Current calculation step 34 determines a Feed Forward current component QFF of Current Demand Qt based on a Feed Forward Current Function QFF(BV,CV) and with reference to a measured Base Variable BVm and/or measured Control Variable CVm. A Current Demand summation step 35 then adds QFF to one or more QFB values from the CV Feedback controller 33 to generate the total Current Demand Qt output from the In-Stroke Controller to the Current Controller 25.

A Current Feedback Controller 36 within the Current Controller 25 receives Current Demand Qt from the In-Stroke Controller. The Current Feedback Controller 36 receives measured current values Qm for each coil and/or phase within the LPS 1 and determines gate switching commands (Represented in FIG. 7 as "1010") output to a Gate Controller 37.

The Current Feedback Controller 36 may utilise a measured Base Variable BVm (For example, FPM position) in order to calculate commutated individual coil or phase current targets from an aggregate Current Demand value Qt. In addition, the Current Feedback Controller 36 may utilise a measured Base Variable BVm (For example, FPM position) to determine an optimum sequence of gate switching commands taking account of LEM characteristics such as coil-to-coil mutual inductance which may depend on BVm.

The Current Controller may include a Gate Controller 37 that applies a voltage to one or more current switching devices 38 such as a an Insulated Gate Bipolar Transistor (IGBT), a Field Effect Transistor (FET), a Triode for Alternating Current (TRIAC), a Solid State Relay (SSR) or other type of electrical power relay.

The Future-Stroke Controller 20, Synchronisation Controller 27, and LAD Controller 22, In-Stroke Controller 23 and Current Feedback Controller 36 are typically low voltage digital electronics with embedded firmware comprising an embedded control system. In contrast, the Gate Controller 37 is connected to the high voltage circuits, high current switches such as TRIACs (triode for alternating current) within one or more Current Switching Devices 38, and is preferably located close to the Stator coils whose currents are modulated by the Current Controller by for example pulse width modulation (PWM). It is preferable therefore that the Gate Controller 37 and Current Switching Devices 38 are separated physically from the other more sensitive digital embedded control system elements 20, 22, 23, 27, 36 so as to protect the latter from the harsh, electrically-noisy environment close to the Stator(s). In the preferred embodiment the Current Feedback Controller 36 and the Gate Controller 37 are separated and connected by a bidirectional serial communications link utilising differential signal circuit switching or optical fibre link for improved noise immunity.

Figure 8:
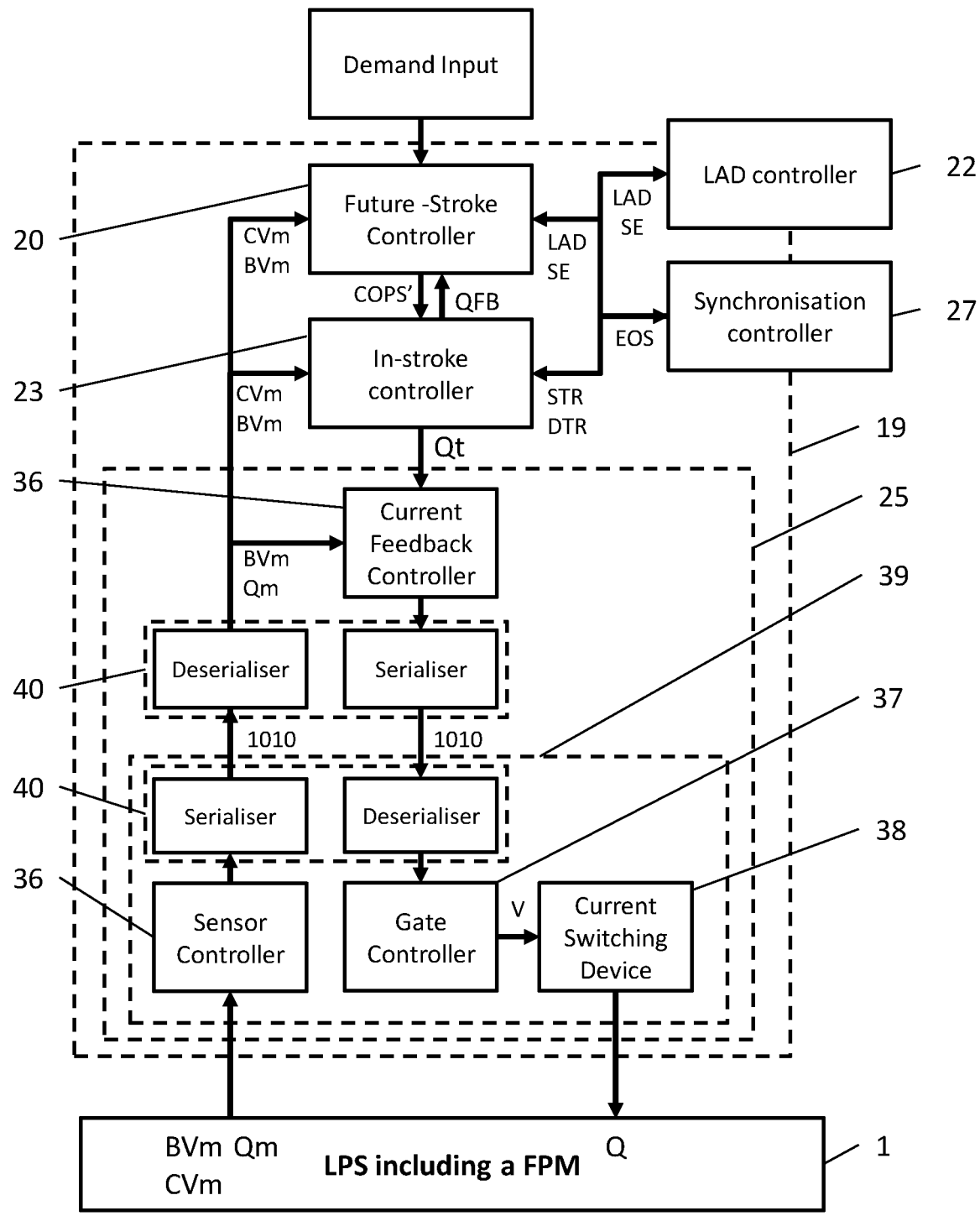
FIG. 8 is a schematic showing additional detail of a Current Controller including an Integrated Gate and Sensor Controller

In FIG. 8, a Sensor Controller 36 is shown, and is preferably physically located close to the sensors within the LPS 1 and to the Gate Controller 37. The LPS sensor signals for measurements including BVm, CVm and Qm are preferable communicated digitally by the Sensor Controller 36 and preferably via a robust differential switching circuit for example ANSI TIA/EIA-422 or TIA/EIA-485 standards, commonly known as RS-422 and RS-485, respectively or via optical fibre. In the case of measurements originating from analog sensors the Sensor Controller 36 may perform analogue to digital conversion.

In FIG. 8 the Sensor Controller, Gate Controller and Current Switching Device are combined in an Integrated Gate and Sensor Controller 39 which may be physically located close to the coils within the LPS and remote from the Current Feedback Controller 36, In-Stroke Controller 23 and Future-Stroke Controller 20.

The communications links for the Gate Controller 37 and Sensor Controller 36 may be independent or may be combined into a single bidirectional serial link typically having a serialiser/deserialiser 40 at each end and allowing for acknowledgements, error checking and correction.

Figure 9:
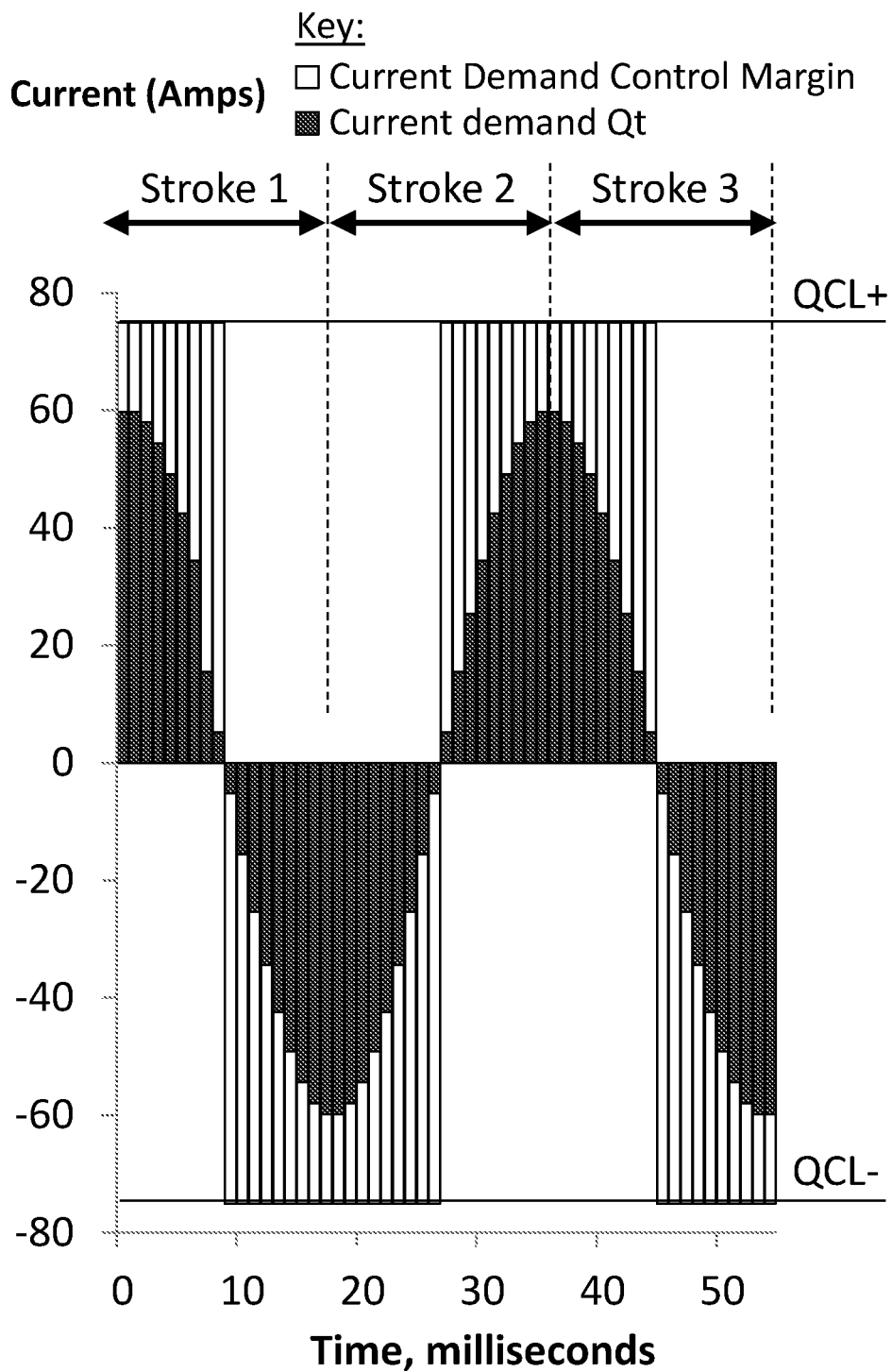
FIG. 9 illustrates Current Demand, Current Limit and Current Demand Control Margin FIG. 10 demonstrates the adaptation of QFF which reduces QFB over multiple strokes

FIG. 9 illustrates total Current Demand Qt, the Current Limits QCL+ and QCL−, and the Current Demand Control Margin QCM corresponding to the minimum difference between the instantaneous Qt and QCL+ or QCL− during three consecutive strokes of FPM.

Figure 10:
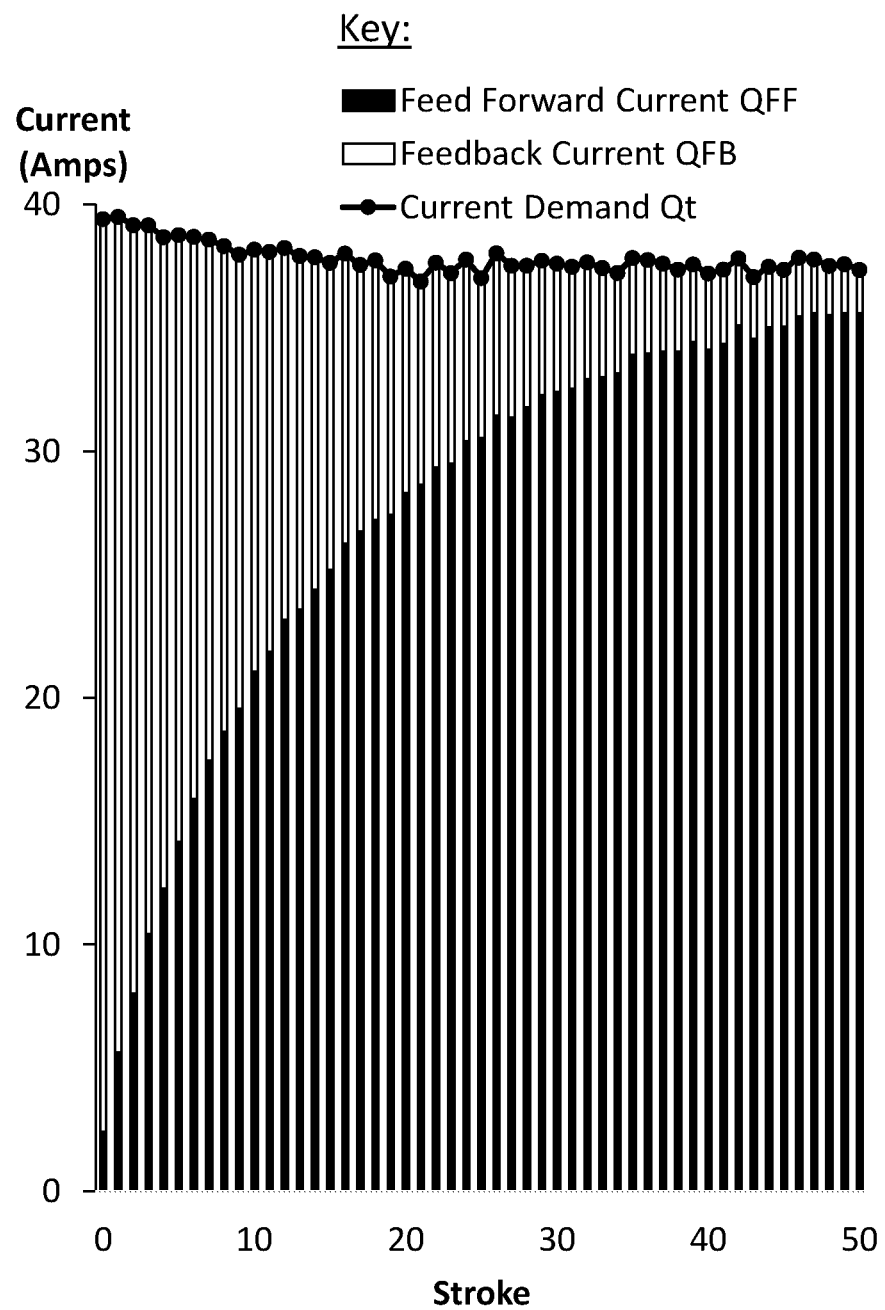

FIG. 10 demonstrates the operation of the FPM controller method of the present invention. FIG. 10 presents experimental test data obtained from a LPS during the first 50 strokes of a longer duration test whilst the FPM within the LPS is controlled using the method according to the present invention to follow a predetermined and fixed Target Control Variable Function. In this test data, Current Demand Qt is composed of the sum of Feedback Current Demand QFB and Feed Forward Current Demand QFF.

During the initial 10 strokes QFB represents the majority of Current Demand Qt. Over the course of 50 strokes the Future-Stroke Controller adds a proportion of QFB recorded at each position in the stroke to the Next Feed Forward Current Function QFF(BV, CV)'. The effect of this adaptation is to progressively increase the contribution of QFF to Qt so that from stroke 40 to stroke 50 over 90% of Qt is provided by QFF.

In embodiments of the present invention where QFB is for example provided by a PID or PI controller, a consequence is reduced control range of QFB resulting in improved control accuracy with reduced Control Variable Error CVe, a reduced tendency to undershoot or overshoot, and an increased Current Demand Control Margin QCM.

FIG. 11 illustrates how a Target Control Variable Function CVt(BV) may be implemented using an array of tabulated values of CV and BV. In this example, the Base Variable BV is position in millimetres and the Control Variable CV is velocity in metres per second.

FIG. 12 illustrates how a Stroke Threshold Function STt(BV,CV) may be implemented using an array of tabulated values of ST and BV. In this example, the Stroke Threshold values ST are defined with respect to the Base Variable BV position (also in millimetres) and the Stroke Threshold values are expressed in the same units as the Control Variable values shown in FIG. 11.

FIG. 13 illustrates how a Feed Forward Current Function QFF(BV,CV) may be implemented using an array of tabulated values of QFF and BV. In this example, the Feed Forward Current Demand values QFF are defined with respect to the Base Variable BV position (also in millimetres).

FIG. 14 illustrates how a Target Control Variable Function CVt(BV), Stroke Threshold Function STt(BV,CV) and Feed Forward Current Function QFF(BV,CV) may, in this example, be incorporated into a common table. In an alternative embodiment of the FPM control method, other constituents of the Control Parameter Set including Feedback Terms Function FBT(BV,CV) could also be incorporated into a common table. This approach facilitates the communication of the Next Control Parameter Set COPS' from the Future-Stroke Controller, and the replacement of the Control Parameter Set COPS with the Next Control Parameter Set COPS' by the Control Parameter Set Selector (30) within the In-Stroke Controller as depicted in FIG. 7.

There are of course many ways that such functions may be implemented for control purposes for example where the values are transposed into a logically wide table.

Each of the functions within the Next Control Parameter Set may also be generated according to an algorithm, simulation model or mathematical formulae that relates one or more Base Variables and/or Control Variables to Target Control Variables, Feed Forward Current Demand values, Stroke Threshold values and Feedback terms.

Figure 15:
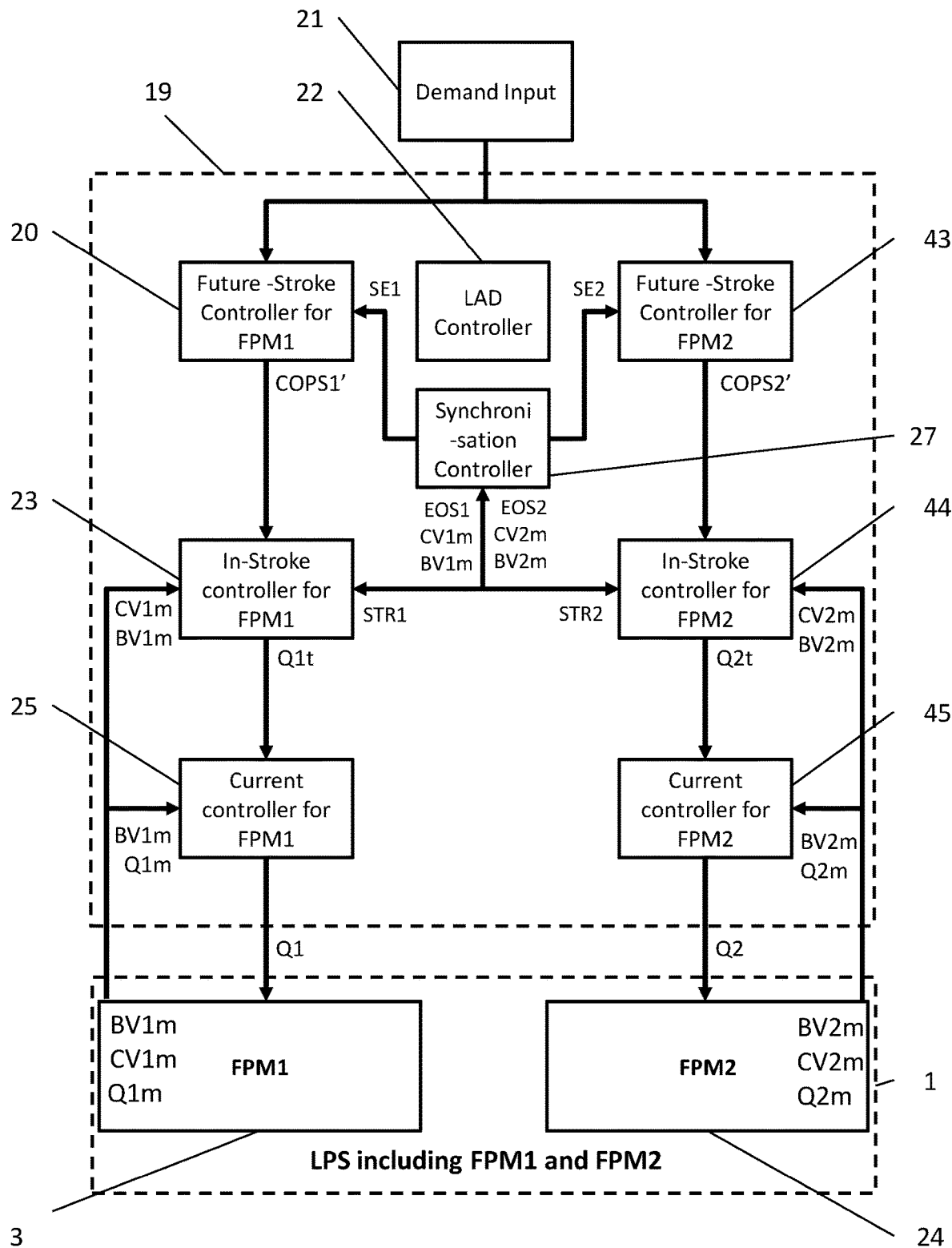
FIG. 15 is a schematic of a Controller for a LPS containing a balanced pair of FPMs

FIG. 15 illustrates how a Free Piston Mover Controller 19 including a Synchronisation Controller 27 may be used to synchronise a pair of Free Piston Movers. For the purposes of this illustration in FIG. 15, the signals to and from the LAD controller 22 within the Free Piston Mover Controller 19 are omitted. Synchronisation control is performed as follows;

Equivalent Demand Input is provided to two Future Stroke Controllers 20, each controlling a respective Free Piston Mover 3, 24 within a LPS 1

Each In-Stroke Controller 23, 44 evaluates In-Stroke performance from LPS sensors corresponding to their respective FPM 3, 24 to determine when a Stroke Transition Threshold Condition has occurred.

If one of the two FPMs 3,24 is leading the other, that FPM is termed the "Lead FPM" and the other is termed the "Lagging FPM", and the motion of the Lead FPM will result in the first Stroke Transition Threshold Condition within the system.

For example, if FPM1 3 is the lead FPM, the In-Stroke Controller for FPM1 23 will determine when a Stroke Transition Threshold Condition has occurred, generate an End of Stroke signal EOS1 and communicate this to the Synchronisation Controller 27. The Synchronisation Controller 27 will then issue a Stroke Transition Trigger STR2 to the In-Stroke Controller for FPM2 44 resulting in an immediate End of Stroke event reported back to the Synchronisation Controller 27 as signal EOS2.

The Synchronisation Controller will then determine a Synchronisation Error SE according to timing of event EOS1. The Synchronisation Error SE may be based on the difference between a measured Base Variable value for each FPM 3, 24 at the EOS1 event, this error termed $SE_{BV}$ Alternatively the Synchronisation Error SE may be based on the difference between a measured Control Variable value for each FPM 3, 24 at the EOS1 event, this error termed $SE_{CV}$.

This Synchronisation Error will be communicated to the Future Stroke Controller for FPM2 43 as SE2. A corresponding Synchronisation SE1 error will be generated, preferably having an equal and opposite value compared to SE2, and will be communicated to the Future Stroke Controller for FPM1 20. Equal and opposite values of SE1 and SE2 are preferred so that the action of the Synchronisation Controller does not substantially impact the mean operating frequency and overall output of the LPS 1.

Each Future-Stroke Controller 20, 43 may utilise Synchronisation Error values as an input to its Control Target Function Generator 26. For example, if SE was was determined as a difference between CV1m and CV2m at EOS1, each Future-Stroke Controller 20, 43 may add a proportion of $SE_{CV}$ to each Target Control Variable value in the next Target Control Variable Function CV1t(BV1)'. Alternatively each Future-Stroke Controller 20, 43 may apply a multiplication factor or other mathematical operation to each Target Control Variable value in the next Target Control Variable Function CV1$t$(BV1)', based on the magnitude of SE$_{CV}$.

It should be obvious that similar or transposed methods may be applied in the case that FPM2 24 is the lead FPM, or in the case that SE is determined as a difference between BV1$m$ and BV2$m$ at EOS1 or EOS2.

In this way, which is the preferred embodiment of the Synchronisation Controller 27, the Synchronisation Controller 27 applies small equal and opposite modifications to the next Target Control Variable Functions CV1$t$(BV1)' and CV2$t$(BV2)' such that the In-Stroke Controllers 23, 44 will slow the Lead FPM and accelerate the Lagging FPM at the next stroke. Over the course of multiple strokes this continual and iterative adjustment serves to effectively minimise any persistent Synchronisation Error between the two Free Piston Movers 3, 24.

Figure 16:
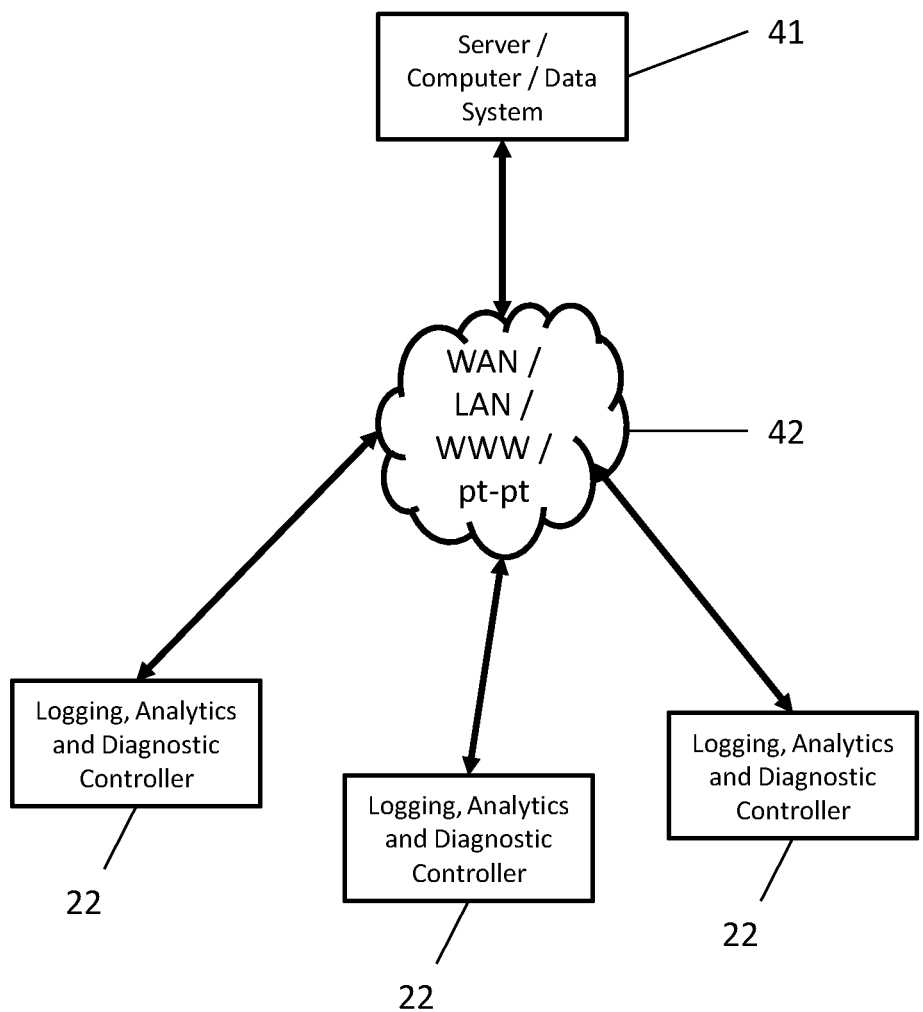
FIG. 16 is a schematic of multiple LAD controllers sharing remote connectivity

FIG. 16 illustrates the potential for remote connectivity of one or more Logging, Analytics and Diagnostic controllers 22. The analytic and diagnostic data logged by each LAD controller 22 may be used locally by a Future-Stroke Controller or to warn of issues or report status. This data may be stored, removed according to a schedule or other algorithm judging future useful value or due to expiration or storage space limitations, or communicated to a remote host. Each LAD controller 22 may be connected to or integrated within controller hardware of the FPM controller 19, deployed on a local network employing but not limited to TCPIP or MODBUS or Controller Area Network (CAN), or hosted on a remote server 41 on a WAN or the world-wide web 42. This architecture also permits communication between multiple Logging, Analytics and Diagnostic controllers 22, for example sharing Vehicle-to-Vehicle analytic and diagnostic data in addition to Vehicle-to-Infrastructure communications.

The Future-Stroke Controller, LAD Controller, Synchronisation Controller, In-Stroke controller, Current Controller and their constituent controllers calculations and steps described in this specification (including communications interfaces and protocols) may be implemented as integrated electronics, programmable logic, in part as analogue or digital circuits and embedded firmware on one or more printed circuit board assemblies and may incorporate one or more Application Specific Integrated Circuits (ASIC) for some or all of a controller's functionality or interface circuits.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of controlling a Free Piston Mover, the method comprising the steps of:

generating a Control Parameter Set for closed loop control of a Target Control Variable, this set comprising a Target Control Variable Function together with one or more of:
a Stroke Threshold Function;
a Feed Forward Current Function;
a Feedback Terms Function;
Control Parameter Set Transition Conditions;
transmitting the Control Parameter Set to an In-Stroke Controller in advance of the start of a Stroke to be controlled;
modifying one or more of the constituents of the Control Parameter Set for any-Future Stroke of the Free Piston Mover using a Future-Stroke Controller;
transmitting the modified Control Parameter Set to the In-Stroke Controller for the control of any Future Stroke;
sampling a Base Variable indicative of Free Piston Mover performance during a Stroke following the generation of the Control Parameter Set;
generating at least one Target Control Variable using the measured Base Variable with reference to a Target Control Variable Function;
determining at least one Control Variable Error using the measured Control Variable and the Target Control Variable;
generating a Current Demand output which is input to a Current Controller using the Control Variable Error;
sampling a second Base Variable indicative of a second Free Piston Mover performance;
generating at least one second Target Control Variable using the measured second Base Variable with reference to a second Target Control Variable Function;
determining at least one second Control Variable Error using the measured second Control Variable and the second Target Control Variable;
generating a Current Demand output which is input to a second Current Controller using the second Control Variable Error; and
modifying the second Target Control Variable Function for a future stroke of the Free Piston Mover using a Future-Stroke Controller which may affect the next stroke or any future stroke.

2. A method according to claim 1, further comprising:
measuring a FPM Synchronisation Error reflecting a difference between a measured Control Variable or measured Base Variable of the second mover and the equivalent measured Control Variable or measured Base Variable of a first mover when a measured variable of either or both mover has become equal to a predefined Stroke Transition Threshold value;
providing a Demand Input;
wherein the Future-Stroke Controller modifies the Control Parameter Set for a subsequent stroke for at least one of the Free Piston Movers based on at least one of:
the measured current, the Current Demand, the FPM Synchronisation Error, the Demand Input.

3. A method according to claim 1, wherein the Target Control Variable Function is an array of Base Variable and Target Control Variable values from which a Target Control Variable can be looked up by reference to the array element corresponding to a measured Base Variable.

4. A method according to claim 3 wherein Target Control Variable Function values for a present stroke and at least one subsequent stroke are stored in a common array.

5. A method according to claim 1, wherein the Target Control Variable Function is either a mathematical formula from which the Target Control Variable can be calculated by applying the measured Base Variable or a simulation model from which the Target Control Variable can be determined by inputting the measured Base Variable.

6. A method according to claim 1, wherein the second Target Control Variable Function is one of an array of Base Variable and Target Control Variable values from which a second Target Control Variable can be looked up by reference to the array element corresponding to a measured second Base Variable, a mathematical formula from which the second Target Control Variable can be calculated by applying the measured second Base Variable, or a simulation model from which the second Target Control Variable can be determined by inputting the measured second Base Variable.

7. A method according to claim 1, further comprising the step of recording a measurable output of one or more of the Free Piston Mover, In-Stroke Controller and Future-Stroke Controller.

8. A method according to claim 1, wherein the Control Parameter Set includes the Feed Forward Current Function and the Feed Forward Current Function comprises Feed Forward Current Demand values for a range of Base Variable values or for a range of Control Variable values.

9. A method according to claim 1, wherein the Current Demand is calculated for the measured Base Variable by addition of at least one Feedback Current Demand value and one Feed Forward Current Demand value.

10. A method according to claim 8, wherein the Future-Stroke Controller adjusts the Feed Forward Current Function for a future stroke by adding a proportion of the Feedback Current Demand value corresponding to one or more measured Base Variable values to the Feed Forward Current Demand values associated with each measured Base Variable value by the Feed Forward Current Function.

11. A computer program comprising computer program code on a non-transitory computer readable medium and adapted to perform a method according to claim 1 when said program is run on a programmable microcomputer.

12. A method of controlling a Free Piston Mover, the method comprising the steps of:
  generating a Control Parameter Set for closed loop control of a Target Control Variable, this set comprising a Target Control Variable Function together with one or more of:
    a Stroke Threshold Function;
    a Feed Forward Current Function;
    a Feedback Terms Function;
    Control Parameter Set Transition Conditions;
  transmitting the Control Parameter Set to an In-Stroke Controller in advance of the start of a Stroke to be controlled;
  modifying one or more of the constituents of the Control Parameter Set for any Future Stroke of the Free Piston Mover using a Future-Stroke Controller;
  transmitting the modified Control Parameter Set to the In-Stroke Controller for the control of any Future Stroke;
  sampling a Base Variable indicative of Free Piston Mover performance during a Stroke following the generation of the Control Parameter Set;
  generating at least one Target Control Variable using the measured Base Variable with reference to a Target Control Variable Function;
  determining at least one Control Variable Error using the measured Control Variable and the Target Control Variable; and
  generating a Current Demand output which is input to a Current Controller using the Control Variable Error;
  wherein the Future-Stroke Controller receives input from a Synchronisation Controller for the two Free Piston Movers.

13. A method according to claim 12, wherein the synchronisation modifications to the Control Parameter Set of the first and second FPMs are opposite in direction.

\* \* \* \* \*